United States Patent
Yoshida et al.

(10) Patent No.: US 7,496,805 B2
(45) Date of Patent: *Feb. 24, 2009

(54) WRITE ONCE TYPE RECORDING MEDIUM, RECORDING DEVICE AND RECORDING METHOD FOR WRITE ONCE TYPE RECORDING MEDIUM, AND REPRODUCTION DEVICE AND REPRODUCTION METHOD FOR WRITE ONCE TYPE RECORDING MEDIUM

(75) Inventors: Masayoshi Yoshida, Tokorozawa (JP); Takeshi Koda, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 514 days.

This patent is subject to a terminal disclaimer.

(21) Appl. No.: 10/549,142

(22) PCT Filed: Mar. 17, 2004

(86) PCT No.: PCT/JP2004/003531

§ 371 (c)(1),
(2), (4) Date: Sep. 15, 2005

(87) PCT Pub. No.: WO2004/084216

PCT Pub. Date: Sep. 30, 2004

(65) Prior Publication Data

US 2006/0181800 A1    Aug. 17, 2006

(30) Foreign Application Priority Data

Mar. 17, 2003   (JP) .............................. 2003-072772

(51) Int. Cl.
G01R 31/28   (2006.01)

(52) U.S. Cl. ................. 714/710; 369/53.15; 369/47.14; 369/53.17; 369/275.3; 714/763; 714/42; 711/112

(58) Field of Classification Search ...................... None
See application file for complete search history.

(56) References Cited

U.S. PATENT DOCUMENTS

| 6,469,978 B1 * | 10/2002 | Ohata et al. ............... 369/275.3 |
| 6,933,802 B2 * | 8/2005 | Kushitani et al. ........... 333/103 |
| 7,228,376 B2 * | 6/2007 | Sasaki ........................ 711/103 |
| 2004/0090888 A1 * | 5/2004 | Park et al. ................. 369/47.14 |
| 2004/0125716 A1 * | 7/2004 | Ko et al. .................... 369/47.14 |
| 2004/0158768 A1 * | 8/2004 | Park et al. ....................... 714/7 |
| 2004/0184373 A1 * | 9/2004 | Hwang et al. ............. 369/47.14 |
| 2004/0193947 A1 * | 9/2004 | Park et al. ....................... 714/6 |
| 2005/0128904 A1 * | 6/2005 | Hwang et al. ............. 369/47.14 |

FOREIGN PATENT DOCUMENTS

| JP | 02-236865 | 9/1990 |
| JP | 63-282967 | 11/1998 |

* cited by examiner

*Primary Examiner*—Jacques H Louis-Jacques
*Assistant Examiner*—Steven D Radosevich
(74) *Attorney, Agent, or Firm*—Young & Thompson

(57) ABSTRACT

A plurality of defect management areas (14A, 14B, 14C) are arranged on a write once type recording medium (10). Spare areas (12, 13) are divided into a plurality of partial spare areas (12A to 13B) and the defect list (21) is divided into partial defect lists (21A to 21D) so as to correspond to this. When recording data is recorded in a partial spare area, only the partial defect list corresponding to the partial spare area is recorded in the defect management area. In one defect management area, all the defect lists constituting the latest defect list are recorded.

16 Claims, 17 Drawing Sheets

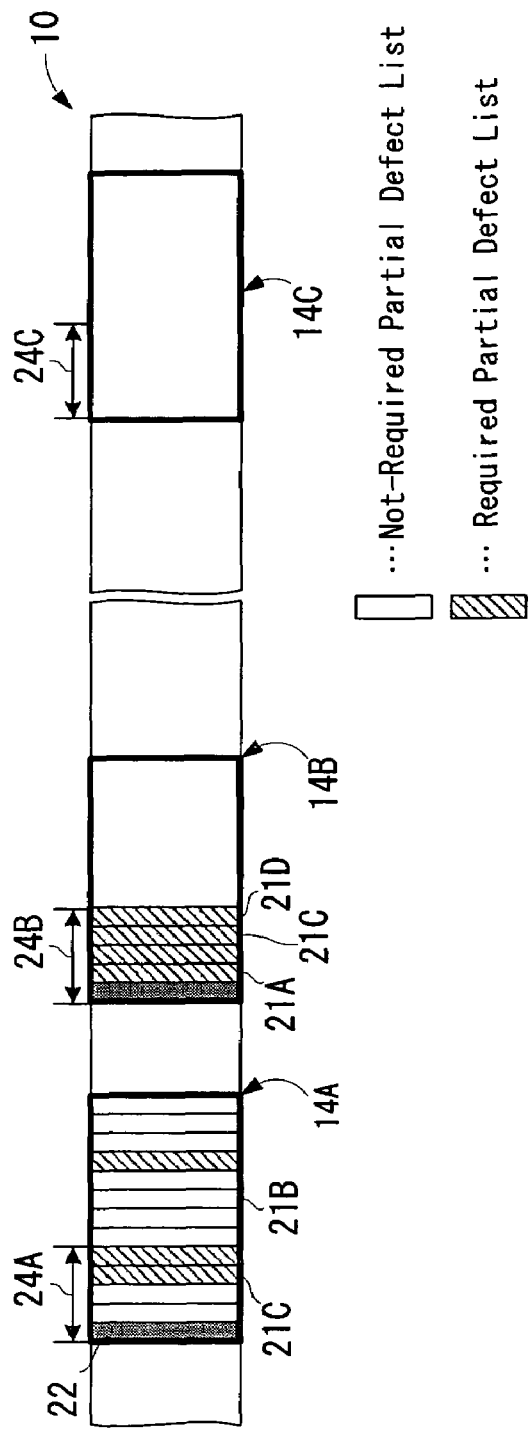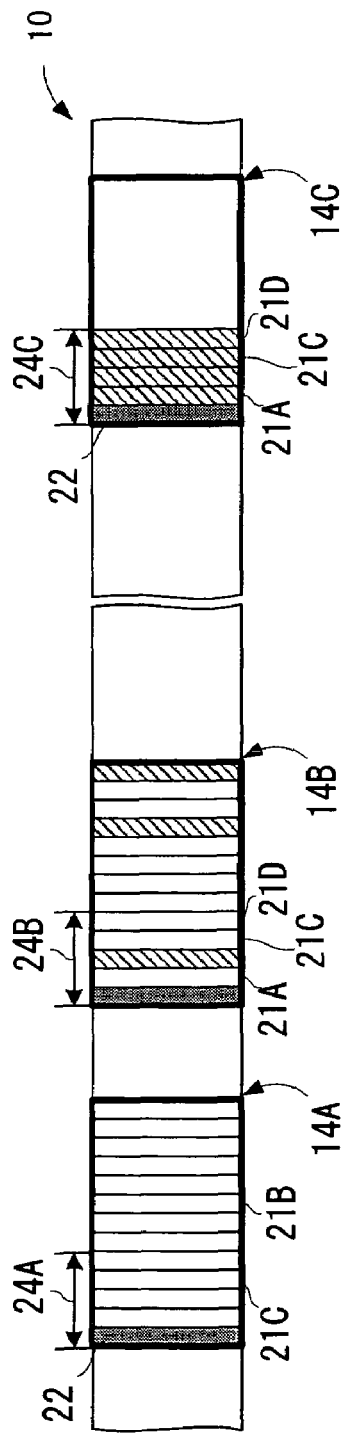

{ Start Address of User Data Area
End Address of User Data Area
Size of Inner Spare Area
Size of Outer Spare Area
Other Info

142A

| Defect Address | Spare Address | Other Info. |
|---|---|---|
| Address aaaa | Address gggg | |
| Address bbbb | Address kkkk | |
| Address cccc | Address mmmm | |
| Address dddd | Address nnnn | |
| ⋮ | ⋮ | |

WRITE ONCE TYPE RECORDING MEDIUM, RECORDING DEVICE AND RECORDING METHOD FOR WRITE ONCE TYPE RECORDING MEDIUM, AND REPRODUCTION DEVICE AND REPRODUCTION METHOD FOR WRITE ONCE TYPE RECORDING MEDIUM

TECHNICAL FIELD

The present invention relates to a write-once-type recording medium, a recording apparatus for and a recording method of recording record data onto the write-once-type recording medium, and a reproducing apparatus for and a reproducing method of reproducing the record data recorded on the write-once-type recording medium.

BACKGROUND ART

As a technique of improving the reliability of the recording and reading of record data on a high-density recording medium, such as an optical disk, a magnetic disk, and a magneto optical disk, there is defect management. Namely, when there are scratches or dusts, or deterioration (which are collectively referred to as a "defect") on the recording medium, data to be recorded or already recorded at the position of the defect is recorded into another area on the recording medium (which is referred to as a "spare area"). As described above, by evacuating to the spare area the record data which is possibly imperfectly or incompletely recorded or read because of the defect, it is possible to improve the reliability of the recording and reading of the record data (refer to Japanese Patent Application Laying Open No. Hei 11-185390).

In general, a defect list is generated to perform the defect management. On the defect list, there are recorded address information for indicating the position of a defect on the recording medium, and address information for indicating a position in the spare area (e.g. a recording position in the spare area) to which the data to be recorded or already recorded at the position of the defect is evacuated.

In general, the defect list is generated when a recording medium is initialized or formatted. It is also generated when the record data is recorded onto the recording medium and the position of the defect is found by verifying the record data, or the like. When the record data is recorded and rewritten several times, the defect list is generated or updated every time the record data is recorded and rewritten.

When the record data is recorded onto the recording medium, the defect list is referred to. This allows the recording of the record data onto the recording medium away from the position of a defect. On the other hand, the defect list is also referred to when the record data recorded on the recording medium is reproduced or read. This makes it possible to surely read both the record data recorded in a normal recording area and the record data recorded in the spare area because of the presence of a defect, on the basis of the defect list.

The defect list is generally recorded in a specific area on the recording medium, which is the object of the generation or updating of the defect list. The defect list is read from the recording medium when the record data recorded on the recording medium is reproduced or when other record data is rewritten or additionally recorded. Then the defect list is referred to in a recording operation by a recording apparatus or in a reproduction operation by a reproducing apparatus.

DISCLOSURE OF INVENTION

The defect list is recorded in a specific area on the recording medium. For example, with respect to a rewritable-type optical disk using a blue laser, the defect list is recorded in a predetermined area (which is hereinafter referred to as a "defect management area") reserved in a lead-in area or lead-out area on the disk.

As described above, the defect list is updated when the record data is recorded and rewritten and the position of the defect is found, or the like. Then, the defect list is overwritten in the defect management area on the recording medium, which is the object of the recording and rewriting, every time the defect list is updated by the recording and rewriting of record data. Namely, the defect list in the defect management area is rewritten every time the defect list is updated.

Such updating of the defect list by rewriting it can be realized only in case that the recording medium is rewritable-type. In case that the recording medium is a so-called "write-once-type recording medium", for example, a write-once-type optical disk, it is necessary to use another method to realize the updating of the defect list.

However, it is not easy to realize the updating of the defect list on the write-once-type recording medium. For example, if the defect list is merely additionally recorded or written once onto the recording medium every time the defect list is updated, it is necessary to provide the defect management area large enough to record a plurality of defect lists, on the recording medium. However, the provision of the large defect management area causes such a problem that a data area to record the record data therein is reduced by that much and that a recording capacity for the record data is reduced. Moreover, the provision of the large defect management area makes the recording structure of the write-once-type recording medium different from that of a general rewritten-type recording medium, which causes a problem of a loss of compatibility between the both. Furthermore, if a plurality of new and old defect lists is recorded into the defect management area, it is not easy to efficiently specify the newest defect list from the plurality of defect lists.

It is therefore a first object of the present invention to provide: a write-once-type recording medium which allows the efficient recording of the defect list; a recording apparatus and a recording method for the write-once-type recording medium; and a reproducing apparatus and a reproducing method for the write-once-type recording medium.

A second object of the present invention is to provide: a write-once-type recording medium which allows the decrease of the defect management area and which allows the increase of a recording capacity for the record data while increasing the reliability of an operation for recording and/or reading the record data; the recording apparatus and the recording method for the write-once-type recording medium; and the reproducing apparatus and the reproducing method for the write-once-type recording medium.

A third object of the present invention is to provide: a write-once-type recording medium which has a defect management function and which is compatible with a rewritable-type recording medium; the recording apparatus and the recording method for the write-once-type recording medium; and the reproducing apparatus and the reproducing method for the write-once-type recording medium.

The above objects of the present invention can be achieved by a write-once-type recording medium provided with: a data area in which record data is recorded; a spare area in which the record data to be recorded or already recorded at a position of a defect in the data area is recorded; and a plurality of defect management areas in which defect management information including a defect list is recorded, the defect list indicating the position of the defect in the data area and a position in the spare area at which the record data to be recorded or already recorded at the position of the defect is recorded, the spare area being divided into a plurality of partial spare areas, the defect list being divided into a plurality of partial defect lists, each of the plurality of partial spare areas corresponding to respective one of the plurality of partial defect lists, index information being appended to at least one of the plurality of partial defect lists, the index information being for specifying other partial defect lists minimally required for constitution of the newest defect list with the one partial defect list, a setup area being prepared in each of the defect management areas, the setup area being for recording all of the partial defect lists minimally required for the constitution of the newest defect list.

The above objects of the present invention can be also achieved by a recording apparatus for recording record data onto a write-once-type recording medium provided with: (i) a data area in which record data is recorded; (ii) a spare area in which the record data to be recorded or already recorded at a position of a defect in the data area is recorded; and (iii) a plurality of defect management areas in which defect management information including a defect list is recorded, the defect list indicating the position of the defect in the data area and a position in the spare area at which the record data to be recorded or already recorded at the position of the defect is recorded, the spare area being divided into a plurality of partial spare areas, the defect list being divided into a plurality of partial defect lists, each of the plurality of partial spare areas corresponding to respective one of the plurality of partial defect lists, index information being appended to at least one of the plurality of partial defect lists, the index information being for specifying other partial defect lists minimally required for constitution of the newest defect list with the one partial defect list, the recording apparatus provided with: a first recording device for recording the record data into the data area; a memory device for storing therein the defect management information; a defect-detecting device for detecting a defect in the data area; a second recording device for recording the record data to be recorded at the position in the data area of the defect detected by the defect detecting device, into any one of the partial spare areas; a list-updating device for updating the partial defect list by recording, onto the partial defect list corresponding to the partial spare area, information for indicating the position of the defect detected by the defect-detecting device and a position in the partial spare area at which the record data to be recorded at the position of the defect is recorded; a third recording device for recording the partial defect list updated by the list-updating device, into any one of the plurality of defect management areas; and a fourth recording device for recording all the partial defect lists minimally required for the constitution of the newest defect list, into any one of the plurality of defect management areas.

The above objects of the present invention can be also achieved by a reproducing apparatus for reproducing record data recorded on a write-once-type recording medium provided with: (i) a data area in which record data is recorded; (ii) a spare area in which the record data to be recorded or already recorded at a position of a defect in the data area is recorded; and (iii) a plurality of defect management areas in which defect management information including a defect list is recorded, the defect list indicating the position of the defect in the data area and a position in the spare area at which the record data to be recorded or already recorded at the position of the defect is recorded, the spare area being divided into a plurality of partial spare areas, the defect list being divided into a plurality of partial defect lists, each of the plurality of partial spare areas corresponding to respective one of the plurality of partial defect lists, index information being appended to at least one of the plurality of partial defect lists, the index information being for specifying other partial defect lists minimally required for constitution of the newest defect list with the one partial defect list, the reproducing apparatus provided with: a list-obtaining device for specifying all the partial defect lists minimally required for the constitution of the newest defect list, from among the plurality of partial defect lists recorded in any one of the plurality of defect management areas, on the basis of the index information, for reading the plurality of partial defect lists specified, and for combining the plurality of partial defect lists read, to thereby form the newest defect list; and a reproducing device for reproducing the record data recorded in the data area on the basis of the newest defect list formed by the list-obtaining device.

The above objects of the present invention can be also achieved by a first computer program of instructions for tangibly embodying a program of instructions executable by a computer to make the computer function as the above-described recording apparatus of the present invention (including its various aspects).

The above objects of the present invention can be also achieved by a second computer program of instructions for tangibly embodying a program of instructions executable by a computer to make the computer function as the above-described recording apparatus of the present invention (including its various aspects).

The above objects of the present invention can be also achieved by a first computer program product comprising a computer-readable medium for tangibly embodying a program of instructions executable by a computer to make the computer function as the above-described recording apparatus of the present invention (including its various aspects).

The above objects of the present invention can be also achieved by a second computer program product comprising a computer-readable medium for tangibly embodying a program of instructions executable by a computer to make the computer function as the above-described recording apparatus of the present invention (including its various aspects).

According to the first or second computer program product of the present invention, the recording apparatus or the reproducing apparatus of the present invention described above can be embodied relatively readily, by loading the computer program product from a recording medium for storing the computer program product, such as a ROM, a CD-ROM, a DVD-ROM, a hard disk or the like, into the computer, or by downloading the computer program product, which may be a carrier wave, into the computer via a communication device. More specifically, the first or second computer program product may be provided with computer readable codes (or computer readable commands) to make the computer to function as the recording apparatus or the reproducing apparatus of the present invention described above.

The above objects of the present invention can be also achieved by a recording method of recording record data onto a write-once-type recording medium provided with: (i) a data area in which record data is recorded; (ii) a spare area in which the record data to be recorded or already recorded at a position of a defect in the data area is recorded; and (iii) a plurality of defect management areas in which defect management information including a defect list is recorded, the defect list indicating the position of the defect in the data area and a position in the spare area at which the record data to be recorded or already recorded at the position of the defect is recorded, the spare area being divided into a plurality of partial spare areas, the defect list being divided into a plurality of partial defect lists, each of the plurality of partial spare areas corresponding to respective one of the plurality of partial defect lists, index information being appended to at least one of the plurality of partial defect lists, the index information being for specifying other partial defect lists minimally required for constitution of the newest defect list with the one partial defect list, the recording method provided with: a memory process of storing therein the defect management information; a first recording process of recording the record data into the data area; a defect-detecting process of detecting a defect in the data area; a second recording process of recording the record data to be recorded at the position in the data area of the defect detected in the defect detecting process, into any one of the partial spare areas; a list-updating process of updating the partial defect list by recording, onto the partial defect list corresponding to the partial spare area, information for indicating the position of the defect detected by the defect-detecting process and a position in the partial spare area at which the record data to be recorded at the position of the defect is recorded; a third recording process of recording the partial defect list updated in the list-updating process, into one of the plurality of defect management areas if there is a space area in the one defect management area; and a fourth recording process of recording all the partial defect lists minimally required for the constitution of the newest defect list, into another one of the plurality of defect management areas if there is not any space area in the one defect management area.

The above objects of the present invention can be also achieved by a reproducing method of reproducing record data recorded on a write-once-type recording medium provided with: (i) a data area in which record data is recorded; (ii) a spare area in which the record data to be recorded or already recorded at a position of a defect in the data area is recorded; and (iii) a plurality of defect management areas in which defect management information including a defect list is recorded, the defect list indicating the position of the defect in the data area and a position in the spare area at which the record data to be recorded or already recorded at the position of the defect is recorded, the spare area being divided into a plurality of partial spare areas, the defect list being divided into a plurality of partial defect lists, each of the plurality of partial spare areas corresponding to respective one of the plurality of partial defect lists, index information being appended to at least one of the plurality of partial defect lists, the index information being for specifying other partial defect lists minimally required for constitution of the newest defect list with the one partial defect list, the reproducing method provided with: a list-obtaining process of specifying all the partial defect lists minimally required for the constitution of the newest defect list, from among the plurality of partial defect lists recorded in any one of the plurality of defect management areas, on the basis of the index information, of reading the plurality of partial defect lists specified, and of combining the plurality of partial defect lists read, to thereby form the newest defect list; and a reproducing process of reproducing the record data recorded in the data area on the basis of the newest defect list formed in the list-obtaining process.

These functions and other advantages of the present invention will be apparent from the following descriptions of embodiments and examples.

BRIEF DESCRIPTION OF DRAWINGS

FIG. 6 is an explanatory diagram showing a setup function of the defect management information in the embodiment of the write-once-type recording medium;

FIG. 7 is an explanatory diagram showing a setup function of the defect management information in the embodiment of the write-once-type recording medium;

BEST MODE FOR CARRYING OUT THE INVENTION

The embodiments of the present invention will be explained with reference to the drawings hereinafter.

Embodiment of Write-Once-Type Recording Medium

An embodiment of the write-once-type recording medium of the present invention will be explained with reference to the drawings. Incidentally, the drawings used for the explanation of the embodiments of the present invention embody constitutional elements or the like of the recording medium, recording apparatus, and reproducing apparatus of the present invention for the purpose of explaining technical ideas thereof. The shape, size, position, connection relationship, and the like of various constitutional elements or the like are not limited to the drawings.

Figure 1:
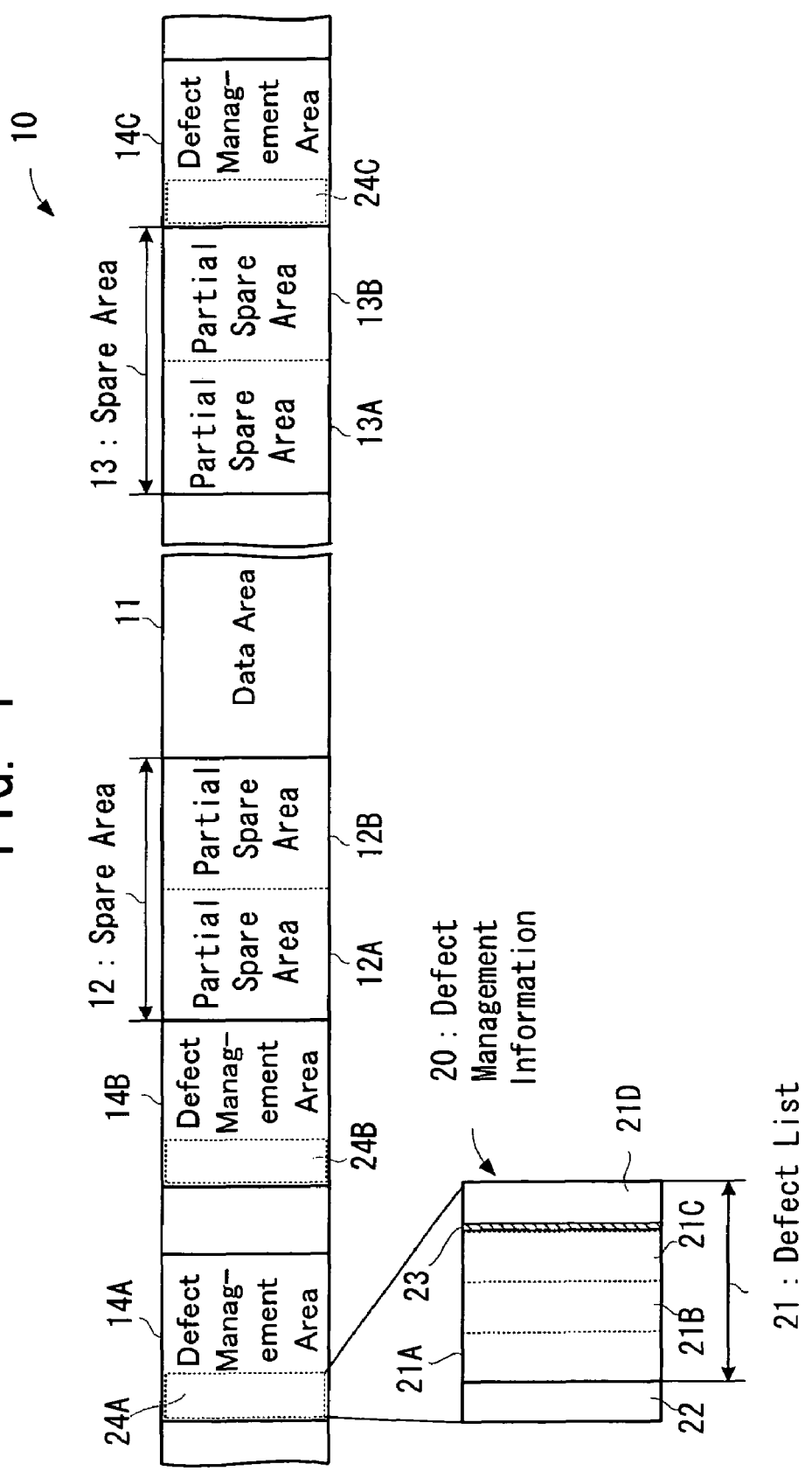
FIG. 1 is an explanatory diagram showing an embodiment of a write-once-type recording medium of the present invention.

FIG. 1 shows the recording structure of the write-once-type recording medium in the embodiment of the present invention. The write-once-type recording medium 10 shown in FIG. 1 is a disk-shaped recording medium. The left side of FIG. 1 is the inner circumferential side of the write-once-type recording medium 10, and the right side is the outer circumferential side of the write-once-type recording medium 10. Incidentally, the shape of the write-once-type recording medium of the present invention is not limited to a disk-shape. The present invention can be applied to recording media of other shapes, such as a card-shaped recording medium. Moreover, there is no limitation on the recording method of the write-once-type recording medium of the present invention. The present invention can be applied to a recording medium which uses, for example, optics, magnetism, magneto-optics, a phase change, the polarization direction of a dielectric substance, near-field optics, or the like.

The recording medium 10 is a write-once-type recording medium which allows the recording of data or information only once at each position.

As shown in FIG. 1, the recording medium 10 is provided with: a data area 11; spare areas 12 and 13; and defect management areas 14A, 14B, and 14C.

The data area 11 is intended to record therein the "record data". The record data is data which is mainly the object of reproduction or execution, including, e.g., image data; audio data; text data; contents data; a computer program; or the like.

The spare areas 12 and 13 are intended to record therein the record data to be recorded or already recorded at the position of a defect in the data area. Namely, if a defect in the data area 11 is detected, the record data to be recorded or already recorded at the position of the defect is recorded into the spare area 12 or 13. The spare area 12 is provided on the inner circumferential side of the data area 11. The spare area 13 is provided on the outer circumferential side of the data area 11. Incidentally, there is no limitation on the number and arrangement of the spare areas.

The spare area 12 is divided into partial spare areas 12A and 12B. The spare area 13 is divided into partial spare areas 13A and 13B. Incidentally, there is no limitation on the number of partitions. Moreover, with respect to the arrangement, the partial spare areas may be physically apart from each other, or may be next to each other.

The defect management areas 14A, 14B, and 14C are intended to record therein defect management information 20. There are three defect management areas 14A, 14B, and 14C on the recording layer of the recording medium 10. The defect management areas 14A, 14B, and 14C are distributed and placed on the recording layer. Incidentally, there is no limitation on the number of the defect management areas. Moreover, there is no limitation on the arrangement or arranging pattern of the defect management areas.

The defect management information 20 is information used for the defect management. The defect management is as follows; namely, when there is a defect, such as scratches, dusts, and deterioration, in or on the recording medium 10, record data is recorded away from the position of the defect. At the same time, record data to be recorded or already recorded at the position of the defect is alternatively recorded into the spare area 12 or 13. Moreover, when record data recorded on the recording medium 10 is reproduced, the following processing is performed as an operation of the defect management: recognizing the position of a defect; and reading the record data to be originally recorded or already recorded at the position of the defect, from the spare area 12 or 13.

The defect management information 20 includes a defect list 21. On the defect list 21, there are recorded: information for indicating the position of a defect in the data area 11 (hereinafter referred to as "defect position information"); and information for indicating a position in the spare area 12 or 13 where the record data to be recorded or already recorded at the position of the defect is recorded (hereinafter referred to as "spare area position information"). For example, the defect information is address information for indicating a defect position, and the spare area position information is address information for indicating a recording position in the spare area 12 or 13. By referring to the defect list 21, it is possible to recognize the position of a defect, and it is possible to read the record data to be originally recorded or already recorded at the position of the defect, from the spare area 12 or 13.

The defect list 21 is divided into partial defect lists 21A, 21B, 21C, and 21D. The partial defect lists 21A, 21B, 21C, and 21D correspond to the partial spare areas 12A, 12B, 13A, and 13B, respectively. When the record data is recorded into the partial spare area 12A, the defect position information and the spare area position information are recorded onto the partial defect list 21A. When the record data is recorded into the partial spare area 12B, the defect position information and the spare area position information are recorded onto the partial defect list 21B. When the record data is recorded into the partial spare area 13A, the defect position information and the spare area position information are recorded onto the partial defect list 21C. When the record data is recorded into the partial spare area 13B, the defect position information and the spare area position information are recorded onto the partial defect list 21D.

With respect to the size of each partial defect list, it has at least a size in which the address information can be recorded by the number corresponding to the number of blocks of the record data which can be recorded in the partial spare area, for example.

Index information 23 is appended to at least one of the partial defect lists 21A, 21B, 21C, and 21D. The index information 23 is information for specifying the other partial defect lists minimally required for the constitution of the newest defect list 21 together with the partial defect list to which the index information 23 is appended.

The index information 23 is preferably appended to the partial defect list placed at the end, out of the partial defect lists continuously arranged and recorded in one defect management area. This allows the efficient reading of the newest defect list 21. For example, in FIG. 1, the partial defect lists 21A, 21B, 21C, and 21D are continuously arranged and recorded in the defect management area 14A, and the partial defect list 21D is placed at the end. In this case, the index information 23 is preferably appended to the partial defect list 21D. The partial defect list placed at the end in the individual defect management area is hereinafter referred to as a "last partial defect list".

With respect to the content of the index information 23, it may be any information if capable of specifying the other partial defect lists minimally required for the constitution of the newest defect list 21. For example, if an identifier is appended to each partial defect list, information for indicating the content of identifiers appended to the other partial defect lists minimally required for the constitution of the newest defect list 21 may be used as the index information 23.

The defect management information 20 may include information other than the defect list 21. In the embodiment, the defect management information 20 includes definition information 22. The definition information 22 is information about the arrangement or size of the data area and the spare area, for example. Moreover, in the embodiment, the index information 23 shall include information for specifying the definition information 22 as well.

In the defect management areas 14A, 14B, and 14C, setup areas 24A, 24B and 24C are prepared, respectively, to record all the partial defect lists 21A, 21B, 21C and 21D minimally required for the constitution of the newest defect list 21. The setup areas 24A, 24B and 24C are preferably placed at the heads of the defect management areas 14A, 14B, and 14C, respectively. This improves the efficiency of the reading processing of the defect list 21. However, there is no limitation on the arrangement of the setup areas 24A, 24B and 24C. Moreover, the arrangement of the setup areas is not necessarily determined in advance, and may be determined immediately, depending on the convenience of the recording processing. Moreover, the setup areas may be separately arranged in each of the partial defect lists 21A, 21B, 21C, and 21D minimally required for the constitution of the newest defect list. Incidentally, the functions of the setup areas 24A, 24B, and 24C will be apparent from the following explanation using FIG. 6 and FIG. 7.

The write-once-type recording medium 10 has a dividing and recording function with respect to the defect management information and a setup function with respect to the defect management information.

Firstly, the dividing and recording function with respect to the defect management information will be explained. The dividing and recording function with respect to the defect management information is a function of dividing the defect list 21 included in the defect management information 20 and recording the divided defect lists into one defect management area. FIG. 2 to FIG. 5 show a state in which the defect management information is divided and recorded in accordance with the dividing and recording function with respect to the defect management information.

At first, when a user inserts or loads the unrecorded recording medium 10 to the recording apparatus, and inputs an instruction which indicates that the recording medium 10 is to be initialized (or formatted), the recording medium 10 is initialized or formatted by the recording apparatus. At this time, the defect management information 20 is generated. Specifically, the partial defect lists 21A, 21B, 21C, and 21D, which correspond to the partial spare areas 12A, 12B, 13A, and 13B, respectively, and the definition information 22 are generated. Moreover, the index information 23 is appended to the partial defect list 21D.

Figure 2:
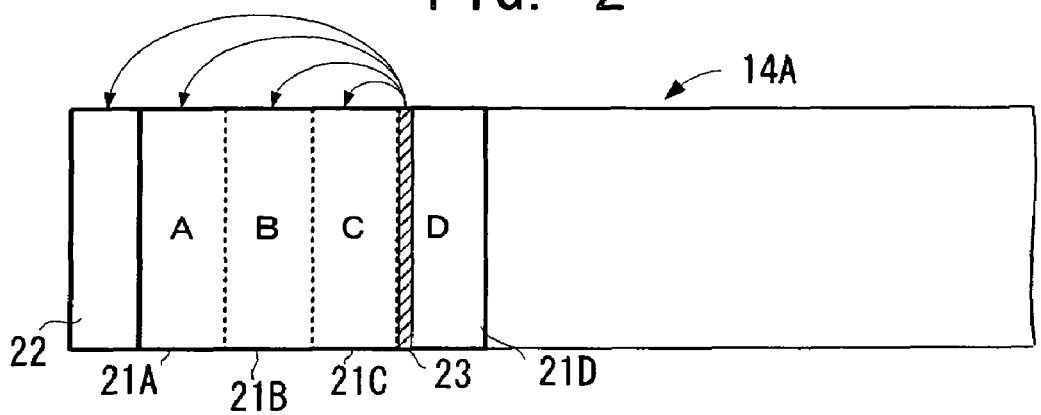
FIG. 2 is an explanatory diagram showing a dividing and recording function of defect management information in the embodiment of the write-once-type recording medium.

As shown in FIG. 2, the generated defect management information 20 is recorded by the recording apparatus, at the head of the defect management area 14A of the recording medium 10. Incidentally, there is no limitation on the order of the defect management areas 14A, 14B, and 14C used for the recording of the defect management information 20 (i.e. the partial defect lists 21A, 21B, 21C, and 21D). In the embodiment, the following method is adopted; the defect management information 20 (i.e. the partial defect lists 21A, 21B, 21C, and 21D) is firstly recorded into the defect management area 14A from the head, secondly recorded into the defect management area 14B from the head when the defect management area 14A is filled up, and thirdly recorded into the defect management area 14C from the head when the defect management area 14B is filled up.

Then, if the user inputs an instruction which indicates the first recording of the record data is performed with respect to the recording medium 10 loaded in the recording apparatus in order to do so, the first recording of the record data is started with respect to the recording medium 10. With the recording of the record data, verify processing is performed. As a result of the verify processing, if the incomplete recording of the record data is clarified, the record data is recorded into the partial spare area 12A. Incidentally, there is no limitation on the order of using the partial spare areas 12A, 12B, 13A, and 13B to record the record data. In the embodiment, the following method is adopted; the record data is firstly recorded into the partial spare area 12A, secondly recorded into the partial spare area 12B when the partial spare area 12A is filled up, thirdly recorded into the partial spare area 13A when the partial spare area 12B is filled up, and fourthly recorded into the partial spare area 13B when the partial spare area 13A is filled up.

When the record data is recorded into the partial spare area 12A, the defect position information which indicates the defect position at that time and the spare area position information are obtained, and they are recorded onto the partial defect list 21A stored in a memory of the recording apparatus. By this, the partial defect list 21A is updated.

After a series of recording of the record data is completed, the index information 23 is appended to the partial defect list 21A stored in the memory of the recording apparatus. The index information 23 is information for specifying the other partial defect lists minimally required for the constitution of the newest defect list 21 with the partial defect list 21A, and for specifying the definition information 22. Therefore, at the present stage, the index information 23 is information for specifying the partial defect lists 21B, 21C, and 21D, and the definition information 22 recorded in the defect management area 14A of the recording medium 10.

Figure 3:
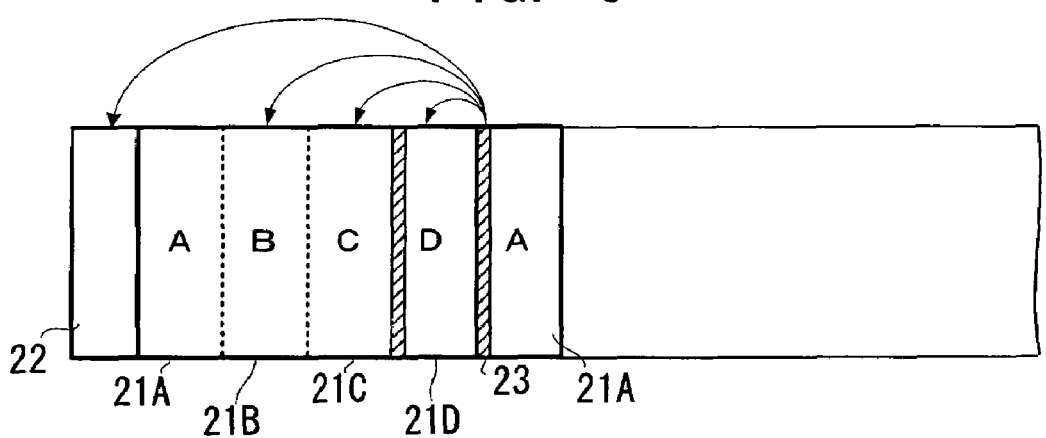
FIG. 3 is an explanatory diagram showing the dividing and recording function of the defect management information in the embodiment of the write-once-type recording medium.

Then, as shown in FIG. 3, out of the defect management information 20, only the updated partial defect list 21A is additionally recorded or written once into the defect management area 14A of the recording medium 10, with the index information 23. In the defect management area 14A, the partial defect list 21A is continuously recorded next to the already recorded partial defect list 21D. Incidentally, at this time, the partial defect lists 21B, 21C, and 21D, and the definition information 22, which are recorded in the memory of the recording apparatus, are not additionally recorded into the recording medium 10.

Afterwards, if the user loads the recording medium 10 again to the recording apparatus in order to perform the second recording of the record data with respect to the recording medium 10, the recording apparatus performs preparation processing. In the preparation processing, the newest defect management information 20 recorded in the defect management area 14A of the recording medium 10 is read. At the present stage, the newest defect management information 20 recorded on the recording medium 10 is constructed from the definition information 22, the partial defect lists 21B, 21C, and 21D, and the last partial defect list 21A, which are recorded in the defect management area 14A, as shown in FIG. 3. Incidentally, in FIG. 3, the last partial defect list 21A, i.e., the partial defect list 21A placed at the end in the defect management area 14A is the one placed on the right side of FIG. 3.

In order to read the newest defect management information 20, at first, the last partial defect list 21A is specified, and the index information 23 appended to the last partial defect list 21A is referred to. On the basis of the index information 23, the definition information 22 and the partial defect lists 21B, 21C, and 21D are specified. Then, the definition information 22 and the partial defect lists 21B, 21C, and 21D are read with the last partial defect list 21A. Then, the newest defect management information 20 is constructed from the read definition information 22, the read partial defect lists 21B, 21C, and 21D, and the read last partial defect list 21A. By this, the preparation operation is completed.

Then, if the user inputs an instruction which indicates the second recording of the record data is performed with respect to the recording medium 10 in order to do so, the second recording of the record data is started with respect to the recording medium 10. For example, if fingerprints or the like are left on the recording surface of the recording medium 10 between the first recording and the second recording, the left fingerprints likely causes the incomplete recording of the record data. As a result of the verify processing, if the incomplete recording of the record data is clarified, the record data is recorded into the partial spare area. For example, if there is a space area or empty area in the partial spare area 12A, the record data is recorded into the partial spare area 12A. If there is not any space area, the record data is recorded into the partial spare area 12B. In the embodiment, it is assumed that the record data is recorded into the partial spare area 12A.

Figure 4:
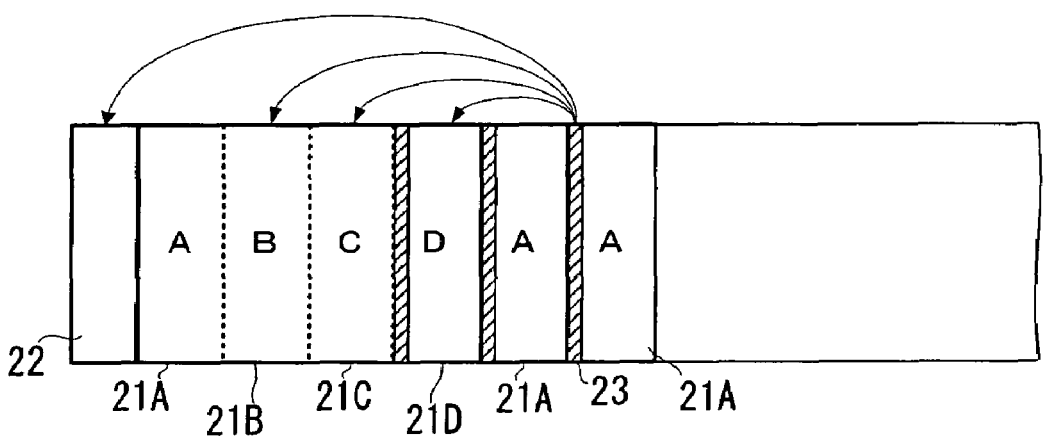
FIG. 4 is an explanatory diagram showing the dividing and recording function of the defect management information in the embodiment of the write-once-type recording medium.

As a result, as in the case of the first recording, the partial defect list 21A is updated. Then, the index information 23 is appended to the partial defect list 21A stored in the memory of the recording apparatus. Then, as shown in FIG. 4, only the updated partial defect list 21A is additionally recorded or written once into the defect management area 14A of the recording medium 10, with the index information 23.

Moreover, the recording of the record data is performed many times with respect to the recording medium 10. If the record data is recorded into the partial spare areas 12A and 12B one after another, due to defects newly formed on the recording medium 10, the partial defect lists 21A and 21B are also updated one after another, along with the recording. As a result, as shown in FIG. 5, several partial defect lists 21A and several partial defect lists 21B are additionally recorded or written once in the partial defect management area 14A.

Figure 5:
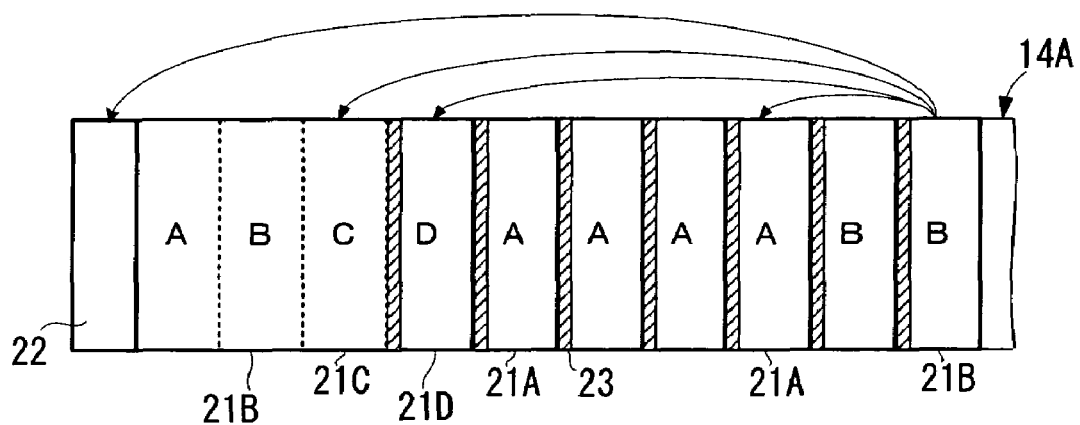
FIG. 5 is an explanatory diagram showing the dividing and recording function of the defect management information in the embodiment of the write-once-type recording medium.

In FIG. 5, the index information 23 appended to the last partial defect list 21B is information for specifying the other partial defect lists minimally required for the constitution of the newest defect list 21 with the last partial defect list 21B, and for specifying the definition information 22. Specifically, it is information for specifying the definition information 22 and the partial defect lists 21C, 21D, and 21A which are pointed by the arrows in FIG. 5. Next time when the recording of the record data is performed with respect to the recording medium 10, the index information 23 appended to the last partial defect list 21B is referred to in the preparation processing. Then, the definition information 22 and the partial defect lists 21C, 21D, and 21A, which are pointed by the arrows in FIG. 5, are read together with the last partial defect list 21B. By using these, the newest defect management information 20 is constructed.

As described above, according to the dividing and recording function with respect to the defect management information on the write-once-type recording medium 10, only the updated partial defect list is additionally recorded or written once into any one of the defect management areas 14A, 14B, and 14C, so that it is possible to reduce the size of the defect management areas 14A, 14B, and 14C. Therefore, it is possible to increase the size of the data area 11. Thus, it is possible to increase the recording capacity for the record data while increasing the reliability of the recording and reading of the record data by the defect management.

Moreover, by appending the index information 23 to the last partial defect list, it is possible to quickly specify the partial defect lists minimally required for the constitution of the newest defect list 21 and the like. Therefore, it is possible to quickly read the newest defect list 21 or the newest defect management information 20.

Furthermore, the partial defect list to which the index information 23 is appended is set to be the last partial defect list, i.e., the one recorded at last in the individual defect management area. Thus, it is possible to read the newest defect list 21 or the newest defect management information 20, easily and quickly. Namely, the recording position of the partial defect list recorded at last in the individual defect management area can be easily detected by recognizing a border between a portion where the partial defect list is recorded and a subsequent unrecorded portion. If the partial defect list recorded at last can be specified, it is possible to quickly specify the partial defect lists minimally required for the constitution of the newest defect list 21 and the like, on the basis of the index information 23 appended to the partial defect list recorded at last. Therefore, it is possible to read the newest defect list 21 or the newest defect management information 20, easily and quickly.

Next, the setup function with respect to the defect management information will be explained. The setup function with respect to the defect management information is a function of recording all the partial defect lists 21A, 21B, 21C, and 21D minimally required for the constitution of the newest defect list 21 and the definition information 22, into the setup area of a new defect management area when the defect management area used for the recording of the defect management information 20 (the partial defect lists 21A, 21B, 21C, and 21D) is changed to the new defect management area. FIG. 6 and FIG. 7 show a state in which the defect management information is recorded into the defect management areas 14A, 14B, and 14C, in accordance with setup function with respect to the defect management information.

If the recording of the record data is performed many times with respect to the recording medium 10 and the partial defect lists are recorded one after another into the defect management area 14A, the defect management area 14A is filled up in the end. In the embodiment, if the defect management area 14A is filled up, the defect management area used for the recording of the partial defect list is changed from the defect management area 14A to the defect management area 14B. At this time, as shown in FIG. 6, all the partial defect lists 21A, 21B, 21D, and 21D minimally required for the constitution of the newest defect list 21 and the definition information 22 are recorded into a setup area 24B of the defect management area 14B. All the partial defect lists 21A, 21B, 21D, and 21D minimally required for the constitution of the newest defect list 21 and the definition information 22 can be specified by the index information 23 appended to the last partial defect list. If all the partial defect lists 21A, 21B, 21D, and 21D minimally required for the constitution of the newest defect list 21 and the definition information 22 are already stored in the memory of the recording apparatus, they are recorded into the setup area 24B of the defect management area 14B. If all the partial defect lists 21A, 21B, 21D, and 21D minimally required for the constitution of the newest defect list 21 and the definition information 22 are not stored in the memory of the recording apparatus, these information is read by the recording apparatus on the basis of the index information 23, and recorded into the setup area 24B of the defect management area 14B.

In the same manner, if the defect management area 14B is filled up, all the partial defect lists 21A, 21B, 21D, and 21D minimally required for the constitution of the newest defect list 21 at that time and the definition information 22 are recorded into a setup area 24C of the next defect management area 14C, as shown in FIG. 7.

As described above, according to the setup function with respect to the defect management information on the write-once-type recording medium 10, all the partial defect lists 21A, 21B, 21D, and 21D minimally required for the constitution of the newest defect list 21 at that time and the definition information 22 are recorded in one defect management area, so that it is possible to quickly read the newest defect list 21 or the newest defect management information 20. Namely, it is enough if one defect management area is searched, in order to obtain the partial defect lists required for the constitution of the newest defect list 21 and the like, and it is unnecessary to search a plurality of defect management areas. Therefore, it is possible to reduce the seek time of the pickup, which allows the quick reading.

Various Aspects in Embodiment of Write-Once-Type Recording Medium

Various aspects in the embodiment of the write-once-type recording medium of the present invention will be explained. In the write-once-type recording medium of the present invention, there is no limitation on the arrangement of the defect management areas. However, if the arrangement of the defect management areas is set as follows, it is possible to provide compatibility between the write-once-type recording medium and a general rewritten-type recording medium.

If there is a control information recording area to record therein information for controlling the recording and reading into a data area, at least one of the plurality of defect management areas may be placed in the control information recording area. The control information recording area is, for example, a lead-in area or a lead-out area.

In a general rewritten-type recording medium, there is provided the control recording area. The defect management area is provided in the control recording area. Therefore, the provision of the defect management area in the control information recording area of the write-once-type recording medium can realize a common structure about the arrangement of the defect management area between the write-once-type recording medium and the general rewritten-type recording medium. Therefore, it is possible to provide the compatibility between the write-once-type recording medium and the general rewritten-type recording medium.

In the case of the write-once-type recording medium, every time the defect management information is updated, it is necessary to additionally record or write once the updated defect management information into the defect management area, and it is impossible to overwrite it as in the rewritten-type recording medium. As a result, the defect management area of the write-once-type recording medium becomes larger than that of the rewritten-type recording medium in size. Therefore, if all the defect management areas are placed in the control information recording area on the write-once-type recording medium, it is necessary to expand the control information recording area. Expanding the control information recording area makes it difficult or impossible to provide the compatibility between the write-once-type recording medium and the general rewritten-type recording medium. Thus, it is preferable to divide the defect management area into a plurality of areas, and place one or two of the areas into the control information recording area.

Moreover, at least one of the plurality of defect management areas may be placed between the control information recording area and the data area.

As described above, if all the defect management areas are placed in the control information recording area, it is necessary to expand the control information recording area, which makes it difficult or impossible to provide the compatibility between the write-once-type recording medium and the general rewritten-type recording medium. On the other hand, it is not preferable to place the defect management area in the data area. This is because if the defect management information, which is one type of the control information, is mixed in a place where the record data is to be recorded, the information management becomes complicated. Thus, if the defect management area is placed between the control information recording area and the data area, it is possible to dissolve the inconvenience. For example, it is desirable to divide the defect management area into a plurality of areas, place one or two of the areas into the control information recording area, and the record the rest of the defect management area between the control information recording area and the data area.

Embodiment of Recording Apparatus

Figure 8:
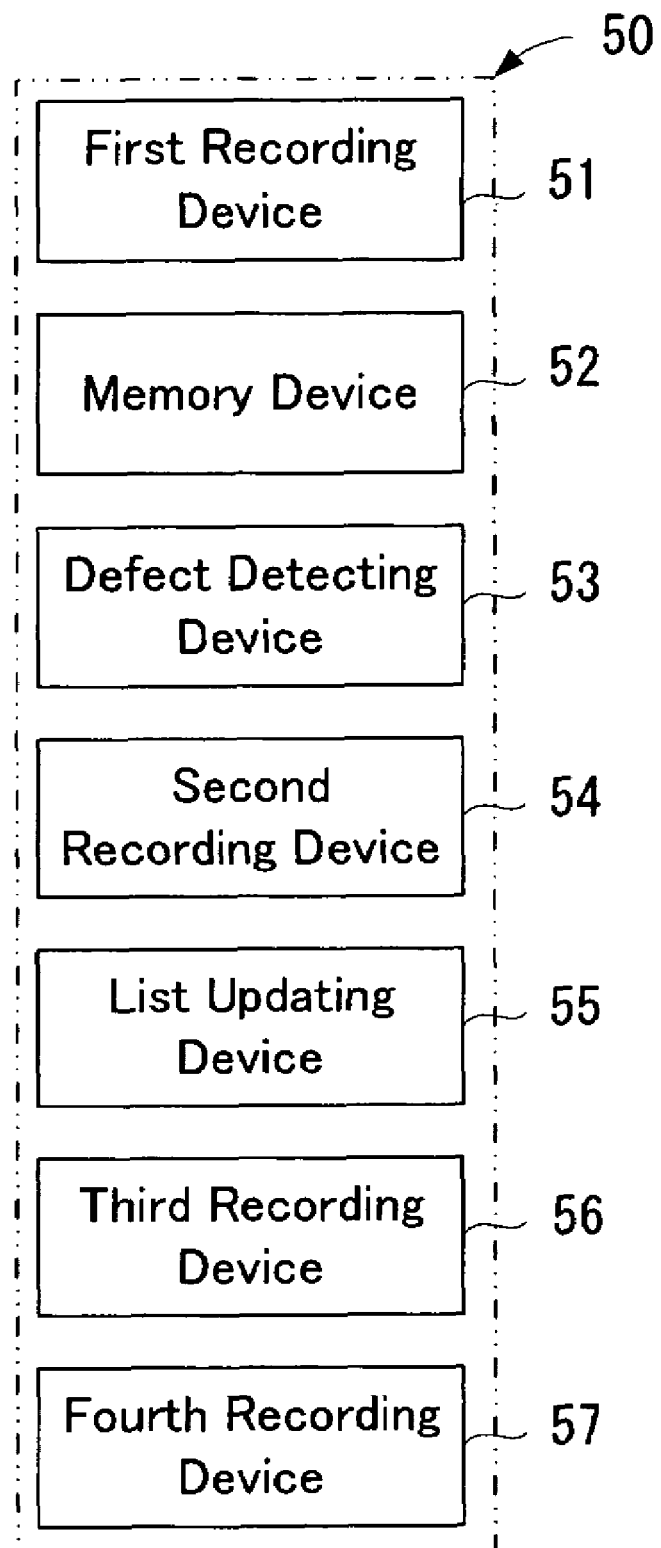
FIG. 8 is a block diagram showing an embodiment of a recording apparatus of the present invention.

The embodiment of the recording apparatus of the present invention will be explained. FIG. 8 shows the embodiment of the recording apparatus of the present invention. A recording apparatus 50 shown in FIG. 8 is a recording apparatus for recording record data onto a write-once-type recording medium. The write-once-type recording medium is provided with: (i) a data area in which record data is recorded; (ii) a spare area in which the record data to be recorded or already recorded at a position of a defect in the data area is recorded; and (iii) a plurality of defect management areas in which defect management information including a defect list is recorded. The defect list indicates the position of the defect in the data area and a position in the spare area at which the record data to be recorded or already recorded at the position of the defect is recorded. The spare area is divided into a plurality of partial spare areas. The defect list is divided into a plurality of partial defect lists. Each of the plurality of partial spare areas corresponds to respective one of the plurality of partial defect lists. Index information is appended to at least one of the plurality of partial defect lists. The index information is for specifying other partial defect lists minimally required for the constitution of the newest defect list with the one partial defect list. For example, the recording apparatus 50 is preferably applied for recording the record data onto the above-described write-once-type recording medium 10.

As shown in FIG. 8, the recording apparatus 50 is provided with: a first recording device 51; a memory device 52; a defect-detecting device 53; a second recording device 54; a list-updating device 55; a third recording device 56; and a fourth recording device 57.

The first recording device 51 records the record data into the data area. If the recording medium is an optical disk, the first recording device 51 can be realized by an optical pickup, a controller for controlling the optical pickup, and the like. Incidentally, the specific hardware structure of the first recording device can be selected depending on a recording method (optics, magnetism, magneto-optics, phase-change, polarization direction of a dielectric substance, near-field optics, or the like) adopted by the recording medium, as occasion demands. For example, it may be a magnetic head or a probe.

The memory device 52 stores therein the defect management information. The memory device 52 can be realized by a memory and the like, for example.

The defect-detecting device 53 detects a defect in the data area. There is a method of using the verifying upon recording, for example, as a method of detecting a defect. Namely, immediately after one block of record data is recorded into the data area, the defect-detecting device 53 reads the one block of record data and checks whether or not the recording is performed normally. At this time, if the imperfection in the recording of the record data is clarified, it is estimated that there is a defect at a position where the record data is recorded or supposed to be recorded. As described above, it is possible to detect a defect by checking the result of the verifying.

The second recording device 54 records the record data to be recorded at the position in the data area of the defect detected by the defect detecting device 53, into any one of the partial spare areas.

The list-updating device 55 updates the partial defect list by recording, onto the partial defect list corresponding to the partial spare area, information (e.g. address information) for indicating the position of the defect detected by the defect-detecting device 53 and a position in the partial spare area at which the record data to be recorded at the position of the defect is recorded.

The third recording device 56 records the partial defect list updated by the list-updating device 55, into any one of the plurality of defect management areas.

The fourth recording device 57 records all the partial defect lists minimally required for the constitution of the newest defect list, into any one of the plurality of defect management areas.

Incidentally, a plurality of sets of hardware, which constitute the first to fourth recording devices 51, 54, 56, and 57, may be provided individually, but usually, one set is enough. For example, it is enough to provide one optical pickup and one controller, and four software for controlling the controller, correspondingly to the relative recording devices.

Hereinafter, the operation of the recording apparatus 50 will be explained. In recording the record data onto the write-once-type recording medium, a user inserts or loads this recording medium into the recording apparatus 50. If the defect management information is recorded in the defect management area on the recording medium, the recording apparatus 50 reads this information and stores it into the memory device 52. If the recording medium is not initialized nor formatted, the recording apparatus 50 initializes or formats the recording medium, and generates the defect management information at that time. The recording apparatus 50 records this information into the defect management area on the recording medium and stores or holds this information into the memory device 52.

Then, the first recording device 51 records the record data into the data area on the recording medium. The record data is verified upon the recording thereof. The defect-detecting device 53 detects a defect in the data area on the basis of the result of the verifying. If a defect is detected, the second recording device 54 records the record data to be recorded at the position in the data area of the defect, into any one of the partial spare areas. Then, the list-updating device 55 records, onto the partial defect list corresponding to the partial spare area, the information for indicating the position of the defect and the position in the partial spare area at which the record data to be recorded at the position of the defect is recorded, and thus updates the partial defect list.

Then, when the recording of the record data by the first recording device 52 is ended, the third recording device 56 selects the partial defect list updated by the list-updating device 55 from among the plurality of partial defect lists included in the defect management information stored in the memory device 52, and records this list into the defect management area.

As the recording of the record data is performed many times with respect to the recording medium, the partial defect lists are recorded into one defect management area one after another. Eventually, when the defect management area is filled up, it is necessary to change the defect management area used for the recording of the partial defect lists (the defect management information). In changing the defect management area, the fourth recording device 57 records all the partial defect lists minimally required for the constitution of the newest defect list, into a next new defect management area.

As described above, according to the recording apparatus 50, it is constructed to select only the updated partial defect list and to record this into the defect management area, so that it is possible to reduce the amount of information recorded in the defect management area. Because of this, it is no longer necessary to provide the large defect management area for the recording medium, and as described above, it is possible to increase the recording capacity for the record data.

Moreover, it is constructed to record all the partial defect lists minimally required for the constitution of the newest defect list, into the defect management area which will be used next, in changing the defect management area used for the recording of the defect management information. Thus, in one defect management area which is in use, there are always all the partial defect lists minimally required for the constitution of the newest defect list. Therefore, by searching only the one in-use defect management area, it is possible to read the partial defect lists minimally required for the constitution of the newest defect list. Thus, it is possible to obtain the newest defect list or the newest defect management information, quickly.

The above objects of the present invention can be also achieved by a first computer program product comprising a computer-readable medium for tangibly embodying a program of instructions executable by a computer to make the computer function as the above-described recording apparatus of the present invention (including its various aspects).

The above objects of the present invention can be also achieved by a second computer program product comprising a computer-readable medium for tangibly embodying a program of instructions executable by a computer to make the computer function as the above-described recording apparatus of the present invention (including its various aspects).

Various Aspects in Embodiment of Recording Apparatus

Figure 9:
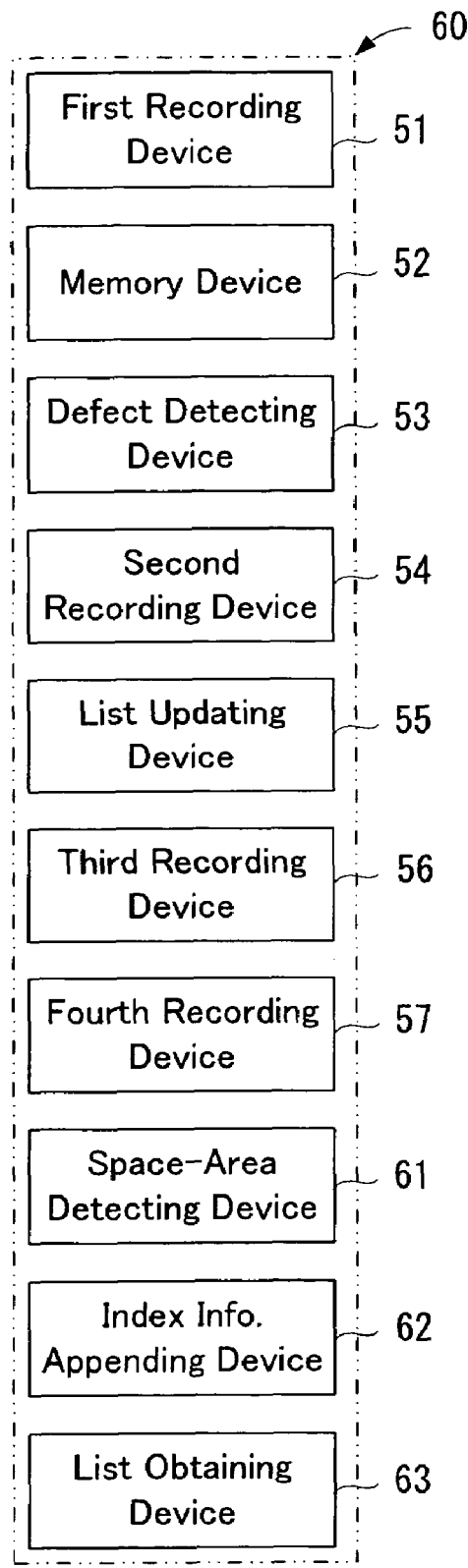
FIG. 9 is a block diagram showing a modified aspect of the embodiment of the recording apparatus of the present invention.

Various aspects in the embodiment of the recording apparatus of the present invention will be explained. FIG. 9 shows various aspects in the embodiment of the recording apparatus of the present invention.

Firstly, a first aspect will be explained. As shown in a recording apparatus 60 in FIG. 9, it may be provided with an index information appending device 62, in addition to the constitutional elements of the recording apparatus 50. The index information appending device 62 adds the index information to the partial defect list updated by the list-updating device 55, wherein the index information is for specifying the other partial defect lists minimally required for the constitution of the newest defect list with the updated partial defect list. In this case, the third recording device 56 records the partial defect list updated by the list-updating device 55, into the defect management area, together with the index information.

By this, it is possible to obtain the newest defect list or the newest defect management information, quickly, with reference to the index information recorded in the defect management area on the recording medium.

Next, a second aspect will be explained. As shown in the recording apparatus 60 in FIG. 9, it may be further provided with a list-obtaining device 63 in addition to the constitutional elements of the recording apparatus 50. The list-obtaining device 63 specifies all the partial defect lists minimally required for the constitution of the newest defect list, from among the plurality of partial defect lists recorded in any one of the plurality of defect management areas, on the basis of the index information, reads the plurality of partial defect lists specified, combines the plurality of partial defect lists read, to thereby form the newest defect list, and stores the newest defect list into the memory device 52.

According to the list-obtaining device 63, even if there are the partial defect lists unnecessary for the constitution of the newest defect list because the updating of the partial defect list is performed several times, as shown in FIG. 5, it is possible to surely select the partial defect lists required for the constitution of the newest defect list, and it is possible to realize the newest defect list by combining the selected partial defect lists.

Next, a third aspect will be explained. As shown in the recording apparatus 60 in FIG. 9, it may be further provided with a space-area detecting device 61, in addition to the constitutional elements of the recording apparatus 50. The space-area detecting device 61 detects whether or not there is a space area required for the recording of the partial defect list, in one of the plurality of defect management areas. In this case, the fourth recording device 57 records all the partial defect lists minimally required for the constitution of the newest defect list, into another one of the plurality of defect management areas, if there is not any spare area in the one defect management area on the basis of the detection result of the space-area detecting device 61. By this, it is possible to recognize a time of recording all the partial defect lists minimally required for the constitution of the newest defect list, by virtue of the fourth recording device 57.

Embodiment of Reproducing Apparatus

Figure 10:
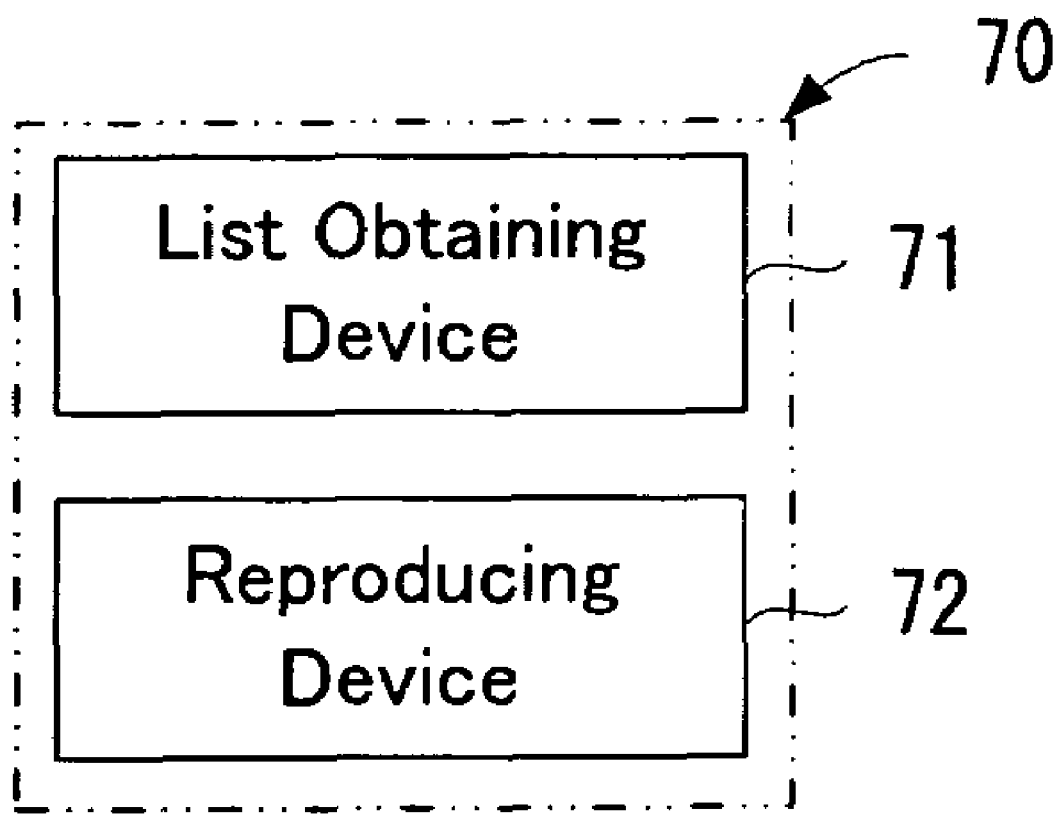
FIG. 10 is a block diagram showing an embodiment of a reproducing apparatus of the present invention.

The embodiment of the reproducing apparatus of the present invention will be explained. FIG. 10 shows the embodiment of the reproducing apparatus of the present invention. A reproducing apparatus 70 shown in FIG. 10 is an apparatus for reproducing record data recorded on a write-once-type recording medium provided with: (i) a data area in which record data is recorded; (ii) a spare area in which the record data to be recorded or already recorded at a position of a defect in the data area is recorded; and (iii) a plurality of defect management areas in which defect management information including a defect list is recorded. The defect list indicates the position of the defect in the data area and a position in the spare area at which the record data to be recorded or already recorded at the position of the defect is recorded. The spare area is divided into a plurality of partial spare areas. The defect list is divided into a plurality of partial defect lists. Each of the plurality of partial spare areas corresponds to respective one of the plurality of partial defect lists. Index information is appended to at least one of the plurality of partial defect lists. The index information is for specifying other partial defect lists minimally required for the constitution of the newest defect list with the one partial defect lists. For example, the reproducing apparatus 70 is an apparatus for reproducing the record data recorded on the above-described write-once-type recording medium 10.

As shown in FIG. 10, the reproducing apparatus 70 is provided with: a list-obtaining device 71; and a reproducing device 72.

The list-obtaining device 71 is a device for specifying all the partial defect lists minimally required for the constitution of the newest defect list, from among the plurality of partial defect lists recorded in any one of the plurality of defect management areas, on the basis of the index information, reading the plurality of partial defect lists specified, and combining the plurality of partial defect lists read, to thereby form the newest defect list. The list-obtaining device 71 is substantially the same as the above-described list-obtaining device 63.

The reproducing device 72 is a device for reproducing the record data recorded in the data area on the basis of the newest defect list formed by the list-obtaining device 71. If the record data is image data, the reproducing device 72 is provided with a decoder for converting the image data to an image signal which can be reproduced on a display, or the like.

As described above, according to the reproducing apparatus 70, it can read all the partial defect lists minimally required for the constitution of the newest defect list, from among the plurality of partial defect lists recorded in the defect management area on the recording medium, and use the read partial defect lists, to thereby form the newest defect list. Then, it can reproduce the record data while performing the defect management on the basis of the newest defect list. Therefore, it is possible to improve the reliability of the reproduction of the record data.

Incidentally, the embodiments described above may be realized in an integral form with hardware as an exclusive apparatus or may be realized by making a computer read a program.

Embodiment of Recording Method

The embodiment of the recording method of the present invention will be explained. The recording method is a method of recording record data onto a write-once-type recording medium provided with: (i) a data area in which record data is recorded; (ii) a spare area in which the record data to be recorded or already recorded at a position of a defect in the data area is recorded; and (iii) a plurality of defect management areas in which defect management information including a defect list is recorded. The defect list indicates the position of the defect in the data area and a position in the spare area at which the record data to be recorded or already recorded at the position of the defect is recorded. The spare area is divided into a plurality of partial spare areas. The defect list is divided into a plurality of partial defect lists. Each of the plurality of partial spare areas corresponds to respective one of the plurality of partial defect lists. Index information is appended to at least one of the plurality of partial defect lists. The index information is for specifying other partial defect lists minimally required for the constitution of the newest defect list with the one partial defect lists.

The recording method is provided with: a memory process of storing therein the defect management information; a first recording process of recording the record data into the data area; a defect-detecting process of detecting a defect in the data area; a second recording process of recording the record data to be recorded at the position in the data area of the defect detected in the defect detecting process, into any one of the partial spare areas; a list-updating process of updating the partial defect list by recording, onto the partial defect list corresponding to the partial spare area, information for indicating the position of the defect detected by the defect-detecting process and a position in the partial spare area at which the record data to be recorded at the position of the defect is recorded; a third recording process of recording the partial defect list updated by the list-updating process, into one of the plurality of defect management areas if there is a space area in the one defect management area; and a fourth recording process of recording all the partial defect lists minimally required for the constitution of the newest defect list, into another one of the plurality of defect management areas if there is not any space area in the one defect management area.

According to this recording method, it is constructed to additionally record or write once only the updated partial defect list, so that it is possible to reduce the amount of information recorded in the defect management area. Because of this, it is no longer necessary to provide the large defect management area for the recording medium, and as described above, it is possible to increase the recording capacity for the record data.

Moreover, according to this recording method, it is constructed to record all the partial defect lists minimally required for the constitution of the newest defect list, into a defect management area which will be used next time, if there is not any space area in the one defect management area. Thus, in reading the defect list next, it is possible to read all the partial defect lists minimally required for the constitution of the newest defect list by searching the one defect management area. Therefore, it is possible to the next defect list or the newest defect management information, quickly.

Embodiment of Reproducing Method

The embodiment of the reproducing method of the present invention will be explained. The reproducing method is a method of reproducing record data recorded on a write-once-type recording medium provided with: (i) a data area in which record data is recorded; (ii) a spare area in which the record data to be recorded or already recorded at a position of a defect in the data area is recorded; and (iii) a plurality of defect management areas in which defect management information including a defect list is recorded. The defect list indicates the position of the defect in the data area and a position in the spare area at which the record data to be recorded or already recorded at the position of the defect is recorded. The spare area is divided into a plurality of partial spare areas. The defect list is divided into a plurality of partial defect lists. Each of the plurality of partial spare areas corresponds to respective one of the plurality of partial defect lists. Index information is appended to at least one of the plurality of partial defect lists. The index information is for specifying other partial defect lists minimally required for the constitution of the newest defect list with the one partial defect lists.

The reproducing method is provided with: a list-obtaining process of specifying all the partial defect lists minimally required for the constitution of the newest defect list, from among the plurality of partial defect lists recorded in any one of the plurality of defect management areas, on the basis of the index information, reading the plurality of partial defect lists specified, and combining the plurality of partial defect lists read, to thereby form the newest defect list; and a reproducing process of reproducing the record data recorded in the data area on the basis of the newest defect list formed in the list-obtaining process.

According to this reproducing method, it is possible to read the partial defect lists required for the constitution of the newest defect list, from among the plurality of partial defect lists recorded in the defect management area on the recording medium, and use the read partial defect lists, to thereby form the newest defect list. Then, it is possible to reproduce the record data while performing the defect management on the basis of the newest defect list. Therefore, it is possible to improve the reliability of the reproduction of the record data.

EXAMPLES

First Example of Write-once-type Recording Medium

Figure 11:
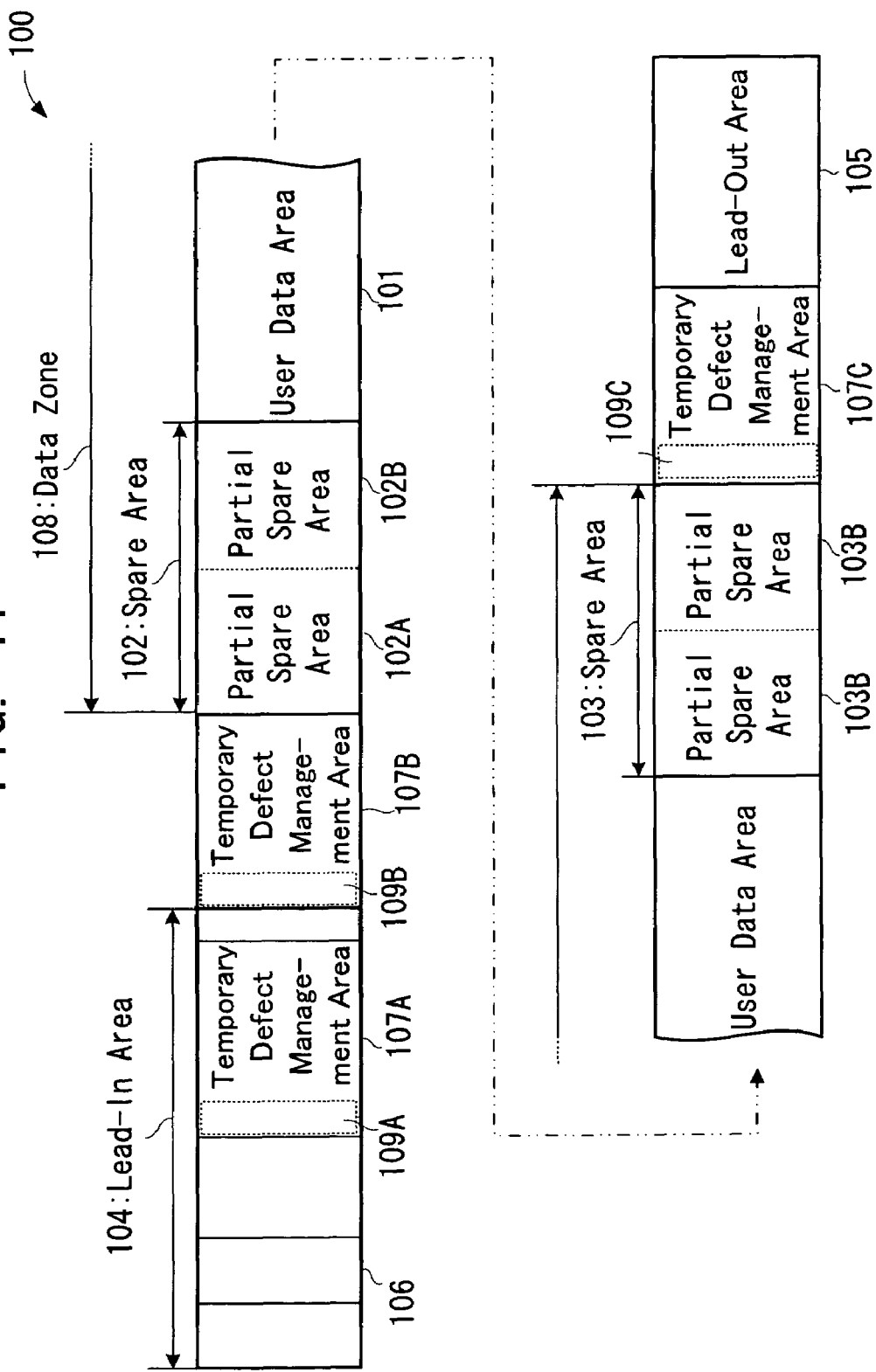
FIG. 11 is an explanatory diagram showing a first example of the write-once-type recording medium of the present invention.

The first example of the write-once-type recording medium of the present invention will be explained. In the first example, the write-once-type recording medium of the present invention is applied to a one-layer write-once-type optical disk. FIG. 11 shows the record structure of the write-once-type optical disk 100. The left side of FIG. 11 is the inner circumferential side of the optical disk 100, and the right side is the outer circumferential side of the optical disk 100.

As shown in FIG. 11, the optical disk 100 is provided with: a user data area 101; spare areas 102 and 103; a lead-in area 104; a lead-out area 105; a definite defect management area 106; and temporary defect management areas 107A, 107B, and 107C.

The user data area 101 is a main area to record therein the record data. The spare areas 102 and 103 are intended to record therein the record data to be recorded or already recorded at the position of a defect if there is the defect in the user data area 101. The spare area 102 is placed on the inner circumferential side of the user data area 101, and the spare area 103 is placed on the outer circumferential side of the user data area 101. A data zone 108 is formed from the user data area 101 and the spare areas 102 and 103. The spare area 102 is divided into partial spare areas 102A and 102B. The spare area 103 is divided into partial spare areas 103A and 103B.

The lead-in area 104 and the lead-out area 105 are intended to record the control information therein. The lead-in area 104 is placed on the most inner circumferential side of the optical disk 100. The lead-out area 105 is placed on the most outer circumferential side of the optical disk 100.

The definite defect management area 106 is intended to definitely record the defect management information. When the optical disk 100 is finalized, the defect management information is recorded into the definite defect management area 106. The definite defect management area 106 is placed in the lead-in area 104.

The temporary defect management areas 107A, 107B and 107C are intended to temporarily record the defect management information. At a stage before the optical disk 100 is finalized, the defect management information is recorded in any one of the temporary defect management areas 107A, 107B and 107C. There are three temporary defect management areas on the optical disk 100. The first temporary defect management area 107A is placed in the lead-in area 104. The second temporary defect management area 107B is placed between the lead-in area 104 and the data zone 108. The third temporary defect management area 107C is placed between the data zone 108 and the lead-out area 105.

With respect to the temporary defect management areas 107A, 107B and 107C, setup areas 109A, 109B and 109C are prepared, respectively. If it is started to use the temporary defect management area 107A for the recording of the defect management information (the partial defect lists), all the partial defect lists minimally required for the constitution of the newest defect list at that time point, and setting information are recorded into the setup area 109A. If it is started to use the temporary defect management area 107B for the recording of the defect management information (the partial defect lists), all the partial defect lists minimally required for the constitution of the newest defect list at that time point, and setting information are recorded into the setup area 109B. If it is started to use the temporary defect management area 107C for the recording of the defect management information (the partial defect lists), all the partial defect lists minimally required for the constitution of the newest defect list at that time point, and setting information are recorded into the setup area 109C.

As described above, according to the optical disk 100, the temporary defect management area 107B is placed between the lead-in are 104 and the data zone 108, and the temporary defect management area 107C is placed between the data zone 108 and the lead-out area 105. Thus, it is possible to provide the compatibility between the optical disk 100 and the general rewritten-type recording medium, and at the same time, it is possible to provide the relatively large temporary defect management area. By this, it is possible to increase the number of times that the defect management information can be updated.

Moreover, the temporary defect management area is divided into the three temporary defect management areas 107A, 107B and 107C, and they are distributed and placed on the optical disk 100. Thus, it is possible to provide the temporary defect management areas having a relatively large size, without greatly change the existing record structure about the optical disk. By this, it is possible to increase the number of times that the defect management information can be updated.

Furthermore, the setup areas 109A, 109B and 109C are prepared in the temporary defect management areas 107A, 107B and 107C, respectively. Then, when it is started to use the temporary defect management areas 107A, 107B and 107C, all the partial defect lists minimally required for the constitution of the newest defect list at that time point, and the setting information are recorded into the setup areas 109A, 109B and 109C, respectively. Thus, it is possible to read the newest defect list and the setting information from the optical disk 100, quickly.

Second Example of Write-once-type Recording Medium

Figure 12:
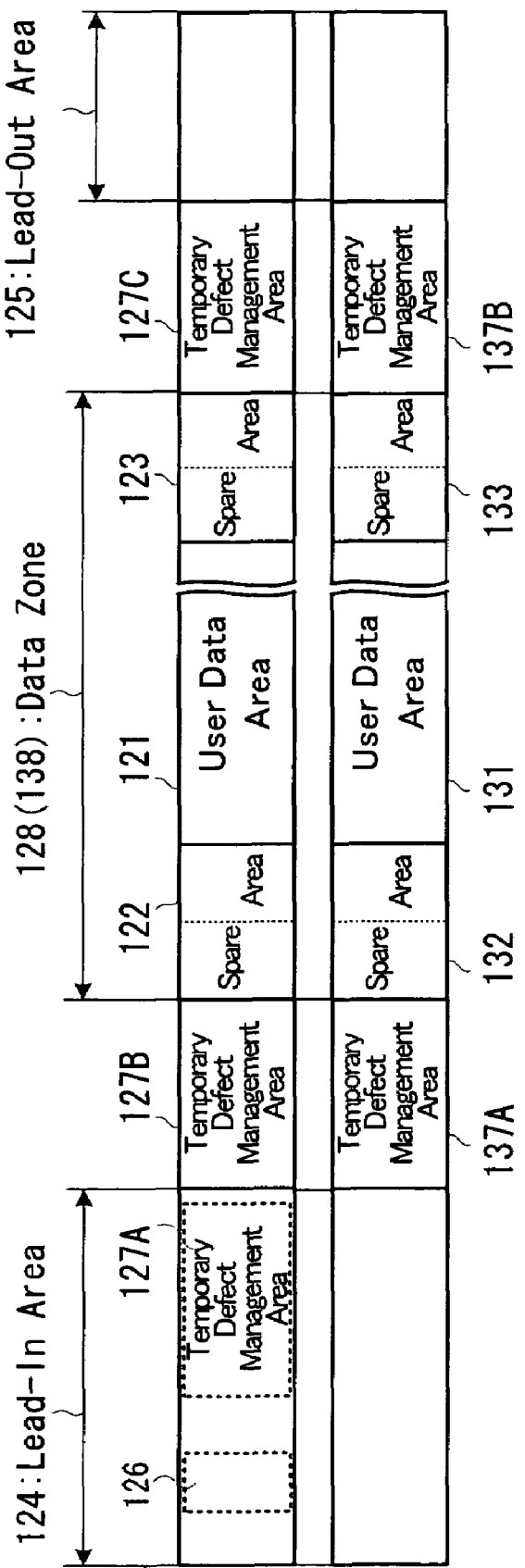
FIG. 12 is an explanatory diagram showing a second example of the write-once-type recording medium of the present invention.

The second example of the write-once-type recording medium of the present invention will be explained. In the second example, the write-once-type recording medium of the present invention is applied to a two-layer write-once-type optical disk. FIG. 12 shows the record structure of the write-once-type optical disk 120. The left side of FIG. 12 is the inner circumferential side of the optical disk 120, and the right side is the outer circumferential side of the optical disk 120.

As shown in FIG. 12, a first layer of the optical disk 120 is provided with: a user data area 121; spare areas 122 and 123; a lead-in area 124; a lead-out area 125; a definite defect management area 126; and temporary defect management areas 127A, 127B and 127C. A data zone 128 is formed from the user data area 121 and the spare areas 122 and 123. A second layer of the optical disk 120 is provided with: a user data area 131; spare areas 132 and 133; a lead-in area 134; a lead-out area 135; a definite defect management area 136; and temporary defect management areas 137A and 137B. A data zone 138 is formed from the user data area 131 and the spare areas 132 and 133. As with the optical disk 100, each spare area is divided into a plurality of partial spare areas, and a setup area is prepared in each temporary defect management area.

Even by virtue of the optical disk 120 having such a structure, it is possible to achieve the same effects or merits as in the optical disk 100.

Example of Defect Management Information

Figures 13, 14:
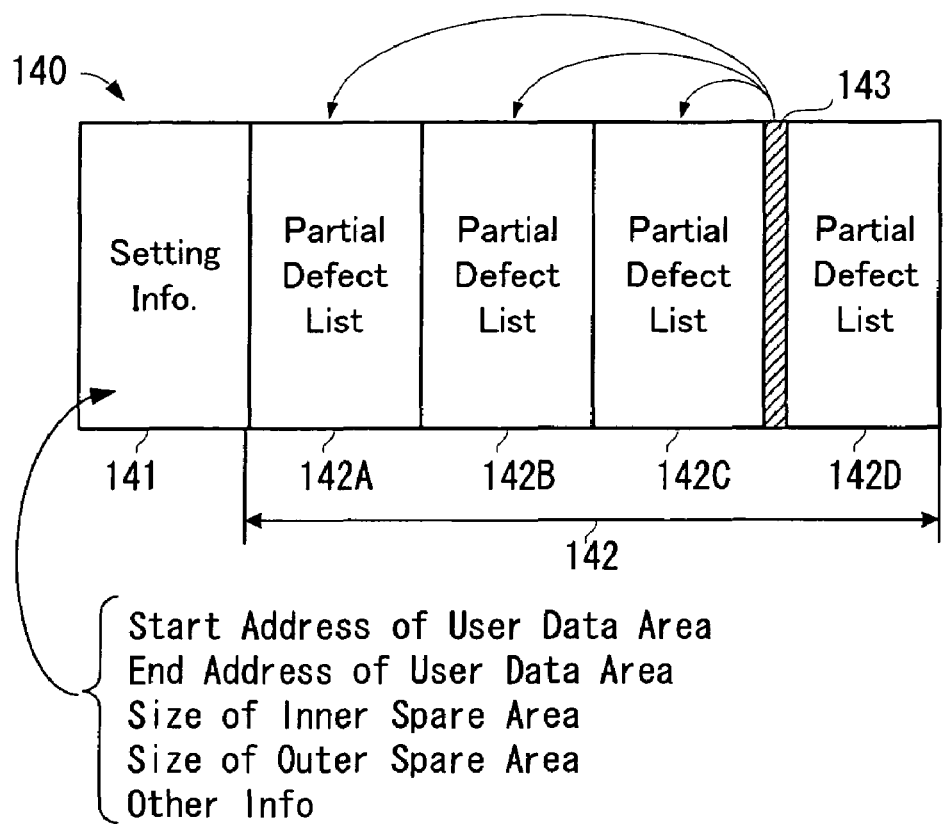
FIG. 13 is an explanatory diagram showing an example of the defect management information associated with the write-once-type recording medium of the present invention.
FIG. 14 is an explanatory diagram showing one example of a partial defect list in the example.

The example of the defect management information of the write-once-type recording medium of the present invention will be explained. FIG. 13 shows the defect management information for the optical disk 100. As shown in FIG. 13, defect management information 140 includes setting information 141 and a defect list 142. The setting information 141 includes: the start address of the user data area 101; the end address of the user data area 101; the size of the inner spare area 102; the size of the outer spare area 103; and other information.

The position and size of the user data area 101 on the optical disk 100 are determined on the basis of the setting information 141. Moreover, the size and position of each of the spare areas 102 and 103 are also determined on the basis of the setting information 141. The setting information 141 is generated by a recording/reproducing apparatus in initializing the optical disk 100, and recorded onto the optical disk as one portion of the defect management information. Therefore, the position and size of the data zone 108 can be arbitrarily set by the recording/reproducing apparatus. For example, by adjusting the start address of the user data area 101, or the size of the spare areas 102 and 103, it is possible to form an area between the lead-in area 104 and the data zone 108, and use the area as the temporary defect management area 107B.

In the defect list 142, there are recorded an address for indicating the position of a defect in the user data area 101 (which is hereinafter referred to as a "defect address"), an address for indicating the recording position in the partial spare area 102A, 102B, 103A or 103B of the record data to be recorded or already recorded at the position of the defect (which is hereinafter referred to as a "spare address"); and other information.

As shown in FIG. 13, the defect list 142 is divided into four partial defect lists 142A, 142B, 142C and 142D. The partial defect list 142A corresponds to the partial spare areas 102A. Namely, if the record data is recorded into the partial spare area 102A, the defect address and the spare address are recorded onto the partial defect list 142A. Moreover, the partial defect list 142B corresponds to the partial spare areas 102B. Namely, if the record data is recorded into the partial spare area 102B, the defect address and the spare address are recorded onto the partial defect list 142B. In the same manner, the partial defect list 142C corresponds to the partial spare areas 103A, and the partial defect list 142D corresponds to the partial spare areas 103B. FIG. 14 shows one example of the content of the partial defect list 142A.

Moreover, an identifier for identifying its own partial defect list and the start address of the partial spare area corresponding to the list itself are appended to each of the partial defect lists 142A to 142D, as the management information (e.g. a header) (which are not illustrated).

Moreover, as shown in FIG. 13, index information 143 is also appended to the partial defect list 142D. The index information 143 includes information for indicating the content of the identifiers of the partial defect lists 142A to 142C. This index information 143 is appended to the partial defect list 142D of the defect list 142, which is generated upon the initialization of the optical disk 100. It is also appended to the partial defect list, which is updated by detecting a defect after the initialization (refer to FIG. 3 to FIG. 5).

As described above, according to the defect management information 140, the defect list 142 is divided into the partial defect lists 142A to 142D, and the partial defect lists 142A to 142D correspond to the partial spare areas 102A to 103B, respectively. Thus, it is possible to update the defect list on each partial defect list. For example, if a defect is detected and the record data is recorded into the partial spare area 102A, the defect address and the spare area are recorded onto the partial defect list 142A corresponding to the partial spare area 102A, and the partial defect list 142A is updated. In this case, only the updated partial defect list 142A may be recorded into any one of the temporary defect management areas 107A, 107B and 107C. By this, it is possible to reduce the amount of information recorded into the defect management areas 107A, 107B and 107C, and reduce the size of the defect management areas 107A, 107B and 107C.

Moreover, by appending the index information 143 to the partial defect list 142D, it is possible to specify and read all the partial defect lists 142A to 142D minimally required for the constitution of the newest defect list, quickly, on the basis of the index information 143.

Examples of Recording Apparatus and Reproducing Apparatus

Figure 15:
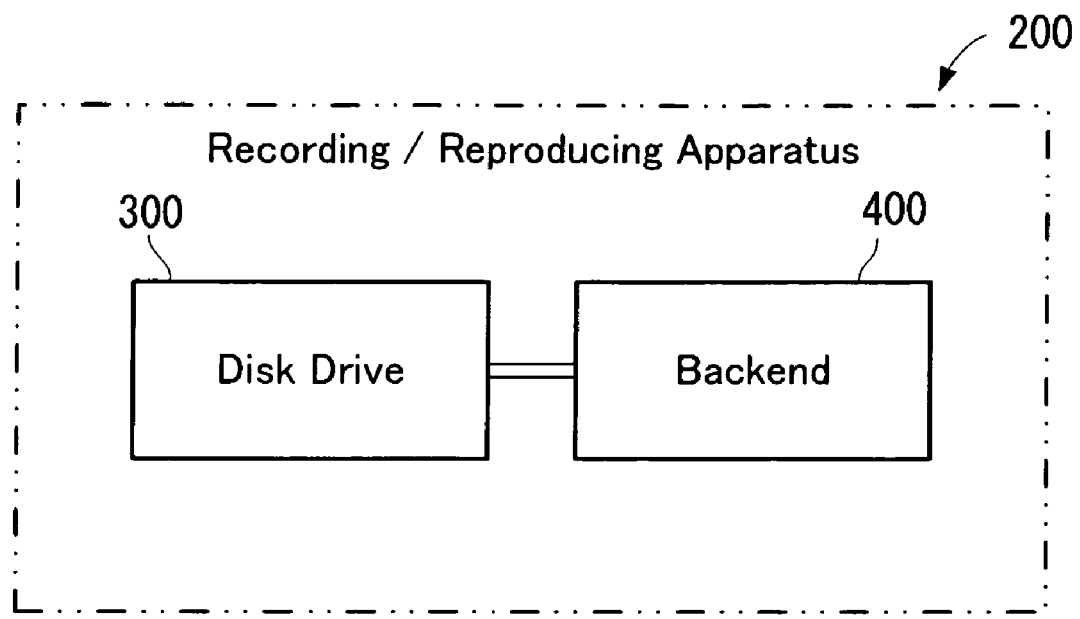
FIG. 15 is a block diagram showing a recording/reproducing apparatus, which is an example of the recording and reproducing apparatuses of the present invention.

The examples of the recording apparatus and the reproducing apparatus of the present invention will be explained. FIG. 15 shows the example of the recording and reproducing apparatuses of the present invention. A recording/reproducing apparatus 200 shown in FIG. 15 is provided with: a function as a recording apparatus of recording the record data onto the optical disk 100; and a function as a reproducing apparatus of reproducing the record data recorded on the optical disk 100.

At first, the structure of the recording/reproducing apparatus 200 will be explained. As shown in FIG. 15, the recording/reproducing apparatus 200 is provided with: a disk drive 300; and a backend 400.

Figure 16:
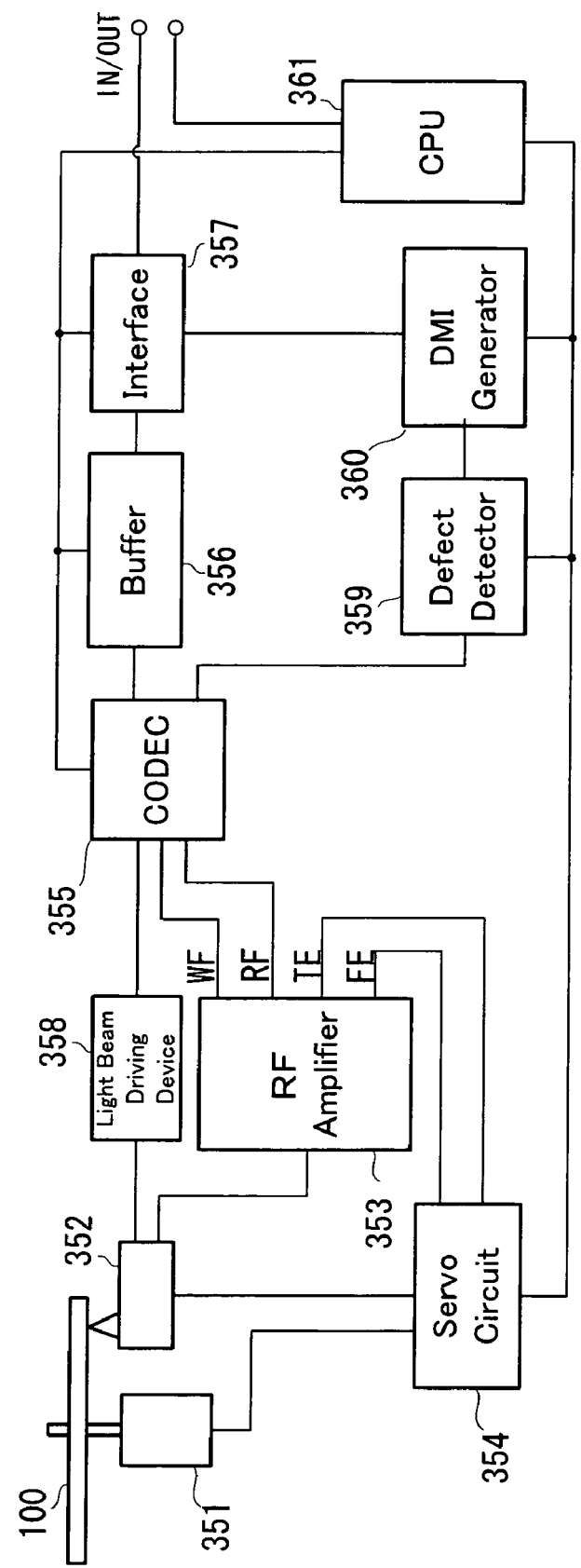
FIG. 16 is a block diagram showing a disk drive.

FIG. 16 shows the inner structure of the disk drive 300. The disk drive 300 records information onto the optical disk 100 and reads the information recorded on the optical disk 100.

As shown in FIG. 16, the disk drive 300 is provided with: a spindle motor 351; an optical pickup 352; a Radio Frequency (RF) amplifier 353; and a servo circuit 354.

The spindle motor 351 is a motor for rotating the optical disk 100.

The optical pickup 352 records the record data or the like onto the recording layer of the optical disk 100, by irradiating the recording layer with a light beam, and reads the record data or the like recorded on the recording layer by receiving reflected light of the light beam. The optical pickup 352 outputs a RF signal corresponding to the reflected light of the light beam.

The RF amplifier 353 amplifies the RF signal outputted from the optical pickup 352 and outputs it to a Coder/Decoder (CODEC) 355. Moreover, the RF amplifier 353 generates, from the RF signal, a wobble frequency signal WF, a track error signal TE, and a focus error signal FE, and outputs them.

The servo circuit 354 is a servo control circuit for controlling the driving of the optical pickup 352 and the spindle motor 351 on the basis of the track error signal TE, the focus error signal FE, and other servo control signals.

Moreover, as shown in FIG. 16, the disk drive 300 is provided with: the CODEC 355; a buffer 356; an interface 357; and a light beam driving device 358.

The CODEC 355 is a circuit, provided with: a function of performing an error correction for the record data upon reading; and a function of appending an error correction code or mark to the record data upon recording so as to demodulate and decode the record data. Specifically, the CODEC 355 demodulates and decodes the RF signal outputted from the RF amplifier 353 upon reading, performs an error correction for the decoded RF signal, and then outputs this to the buffer 356. Moreover, if the error correction is impossible as a result of performing the error correction for the decoded RF signal, the CODEC 355 generates an error-correction-impossible signal for indicating that, and outputs this signal to a defect detector 359. Upon recording, the CODEC 355 appends the error correction code to the record data outputted from the buffer 356, demodulates and decodes this data to have a code suited to the optical characteristics or the like of the optical disk 100, and then outputs the decoded record data to the light beam driving device 358.

The buffer 356 is a memory circuit for storing the record data temporarily.

The interface 357 is a circuit for controlling the input/output or communication of the record data or the like between the disk drive 300 and the backend 400. Specifically, upon reproducing, the interface 357 responds a request command from the backend 400, and outputs the record data outputted from the buffer 356 (i.e. the record data read from the optical disk 100) to the backend 400. Upon recording, the interface 357 receives the record data which is inputted from the backend 400 to the disk drive 300, and outputs this data to the buffer 356. The interface 357 responds a request command from the backend 400 and outputs all or part of the defect lists held in a generator 360 for generating Defect Management Information (DMI generator 360) to the backend 400.

Upon recording, the light beam driving device 358 generates a light beam driving signal corresponding to the record data outputted from the CODEC 355 and outputs this signal to the optical pickup 352. The optical pickup 352 modulates a light beam on the basis of the light beam driving signal, and irradiates the recording layer of the optical disk 100 with it. This causes the recording of the record data or the like on the recording layer.

Moreover, as shown in FIG. 16, the disk drive 300 is provided with: the defect detector 359; and the DMI generator 360.

The defect detector 359 is a circuit for detecting a defect on the optical disk 100. The defect detector 359 generates a defect detection signal for indicating the presence or absence of a defect, and outputs this signal. The defect detector 359 detects a defect on the basis of the result of the error correction of the record data upon reading information (upon verifying or reproducing). As described above, if the error correction is impossible as a result of performing the error correction for the decoded RF signal, the CODEC 355 generates the error correction impossible signal for indicating the fact, and outputs this signal to the defect detector 359. The defect detector 359 outputs the defect detection signal for indicating the presence of a defect when receiving this error correction impossible signal.

The DMI generator 360 is a circuit for generating or updating the defect management information 140 on the basis of the defect detection signal outputted from the defect detector 359. The defect management information 140 is rewritably stored into a memory circuit placed in the DMI generator 360. The DMI generator 360 responds to a request command from the backend 400 and outputs the defect management information 140 to the backend 400 through the interface 357.

Moreover, as shown in FIG. 16, the disk drive 300 has a Central Processing Unit (CPU) 361. The CPU 361 controls the disk drive 300 as a whole, and controls the communication of information among the elements in the disk drive 300 described above. The CPU 361 also controls the recording operation and the reading operation of the record data and the defect management information 140. The CPU 361 responds to a control command or a request commend transmitted from the backend 400, and controls the communication of data between the disk drive 300 and the backend 400.

Figure 17:
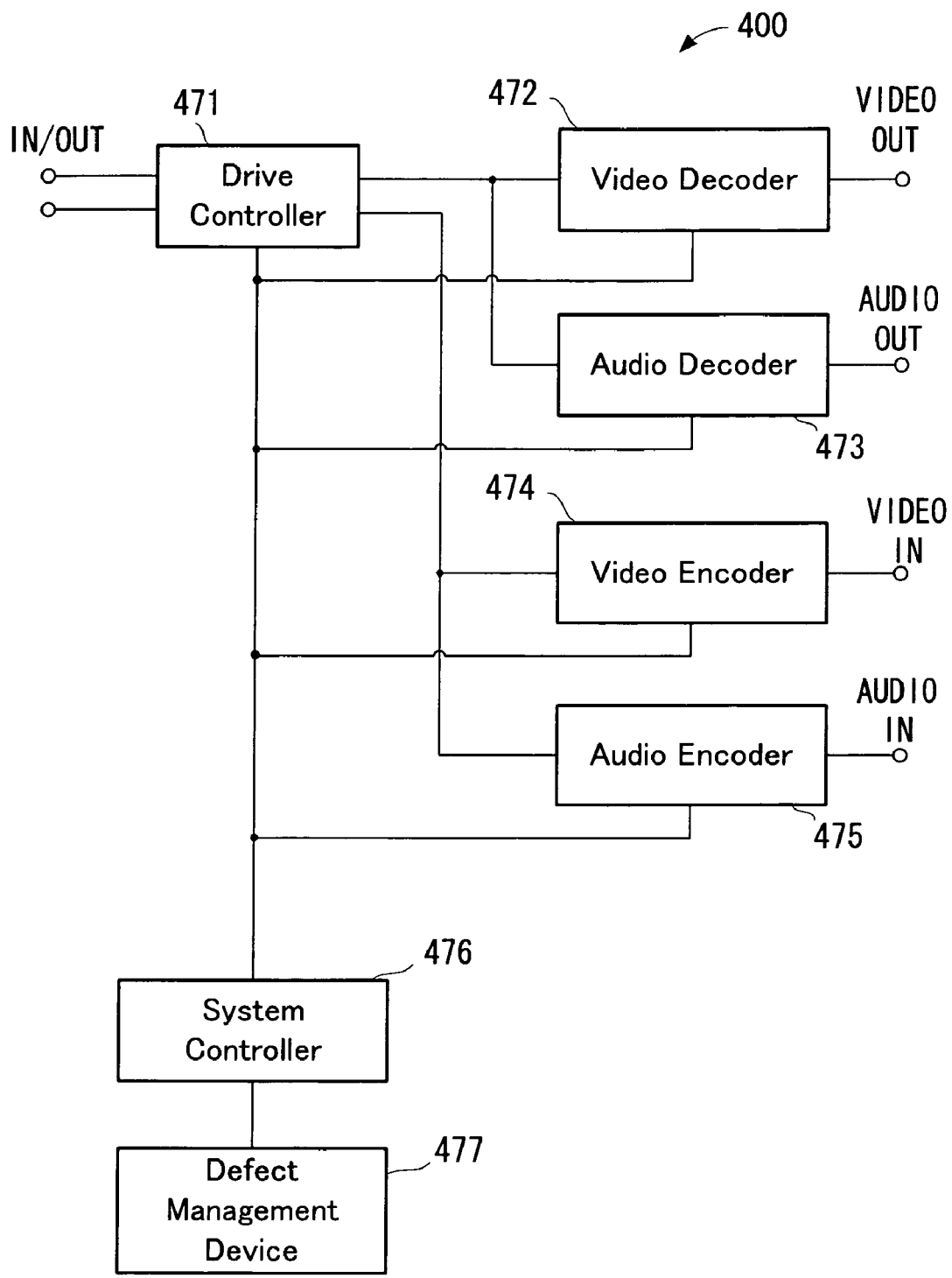
FIG. 17 is a block diagram showing a backend.

Next, FIG. 17 shows the inner structure of the backend 400. The backend 400 is an apparatus for performing reproduction processing with respect to the record data read by the disk drive 300 from the optical disk 100; and for receiving the record data supplied from the outside in order to record it into the optical disk 100, compressing (and encoding) this record data, and transmitting it to the disk drive 300.

The backend 400 is provided with: a drive controller 471; a video decoder 472; an audio decoder 473; a video encoder 474; an audio encoder 475; a system controller 476; and a defect management device 477.

The drive controller 471 is a circuit for controlling the reading processing and recording processing of the disk drive 300. The backend 400 and the disk drive 300 cooperate and perform an operation of reading the record data from the optical disk 100 and reproducing it and an operation of receiving the record data from the outside and recording it onto the optical disk 100. The drive controller 471 realizes the cooperation of the backend 400 and the disk drive 300 by controlling the reading processing and recording processing of the disk drive 300. Specifically, the drive controller 471 outputs to the disk drive 300 request commands about reading, recording, outputting the record data from the buffer 356, outputting the defect management information 140 from the DMI generator 360, and so on. The drive controller 471 also controls the input and output of the record data, the defect management information 140, and other various information.

The video decoder 472 and the audio decoder 473 are circuits for decoding the record data which is read from the optical disk 100 by the disk drive 300 and which is supplied through the drive controller 471, and converting the record data to be reproducible with a display, a speaker, or the like.

The video encoder 474 and the audio encoder 475 are circuit for receiving a video signal, an audio signal, or the like, inputted from the outside for the purpose of recording them on the optical disk 100, compressing and encoding them by Moving Picture Experts Group (MPEG) compressing and encoding method or the like, and supplying them to the disk drive 300 through the drive controller 471.

The system controller 476 is a circuit for controlling: the drive controller 471; the video decoder 472; the audio decoder 473; and the defect management device 477, and performing the reproduction processing of the record data in cooperation with the devices, upon reproducing. Upon recording, the system controller 476 controls: the drive controller 471; the video encoder 474; the audio encoder 475; and the defect management device 477, to thereby record the record data in cooperation with the devices. Upon reproducing and recording, the system controller 476 controls the disk drive 300 (e.g. controls the generation and transmission of various request commands, the reception of a response signal, or the like) with the drive controller 471 in order to realize the cooperation of the disk drive 300 and the backend 400.

The defect management device 477 has therein a memory circuit, and has a function of receiving and holding all or part of the defect management information 140 generated or updated by the DMI generator 360 in the disk drive 300. The defect management device 477 performs the defect management with the system controller 476.

Figure 18:
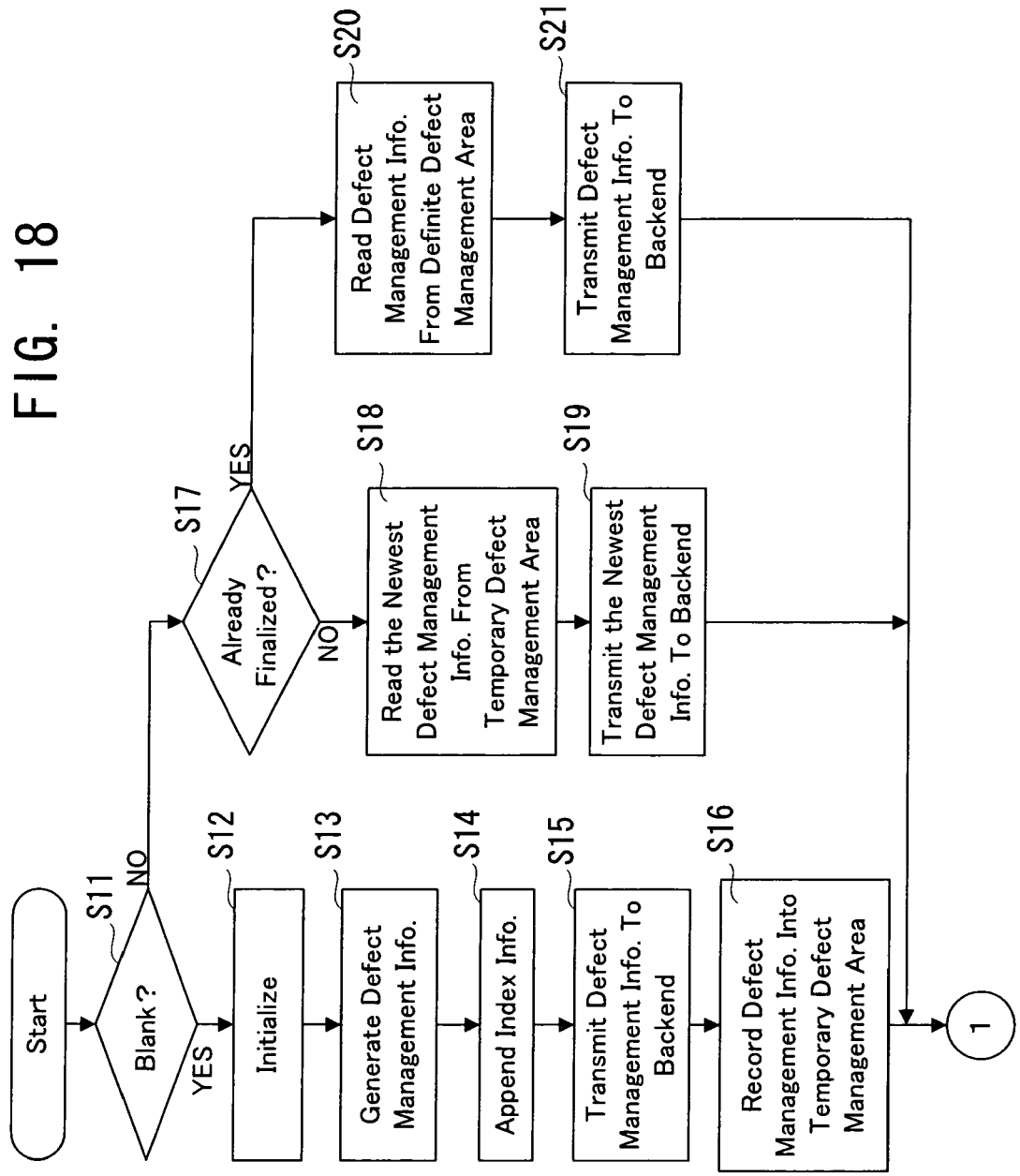
FIG. 18 is a flowchart showing the initial setting processing of the recording/reproducing apparatus.

Next, the initial setting processing of the recording/reproducing apparatus 200 will be explained. FIG. 18 shows the initial setting of the recording/reproducing apparatus 200. The recording/reproducing apparatus 200 performs the initial setting between (i) when the optical disk 100 is inserted or loaded in the drive unit 300 and (ii) when the record data is recorded or reproduced (at the preparation stage of the recording and the reproduction). The initial setting is processing for preparing for the recording or the reproduction of the record data, and includes various processing. Out of the various processing, the initialization of the optical disk 100, the generation and the recording of the defect management information 140, the generation and the recording of the status information, the transmission of the defect management information 140 to the backend 400, or the like will be explained below. The processing is performed mainly under the control of the CPU 361 of the drive unit 300.

As shown in FIG. 18, when the optical disk 100 is inserted or loaded into the drive unit 300, the CPU 361 of the drive unit 300 judges whether or not the optical disk 100 is an unrecorded disk (i.e. a blank disk) (step S11).

If the optical disk 100 is a blank disk (the step S11: YES), the CPU 361 initializes the optical disk 100 (step S12). In this initializing, the DMI generator 360 generates the defect management information 140 (step S13). Specifically, it obtains the start address and end address of the user data area 101 and the area sizes of the spare areas 102 and 103, which are set in the initializing, and generates the setting information 141. Moreover, it generates the defect list 142. The defect list 142 generated at this time has only an outline, not having any content. Namely, the defect address is not recorded in it, nor is the specific spare address. However, the defect list 142 is divided into the partial defect lists 142A to 142D, with each of the partial defect lists 142A to 142D corresponding to the partial spare areas 102A to 103B, respectively. In order to clarify this correspondence relationship, the start address of the corresponding partial spare area is recorded onto each of the partial defect lists as the management information (e.g. a header). Moreover, the identifier for specifying its own partial defect list is also recorded onto each of the partial defect lists as the management information (e.g. a header). The generated defect management information 140 is stored and held in the DMI generator 360.

Then, the DMI generator 360 appends the index information 143 to the partial defect list 142D (step S14).

Then, the CPU 361 transmits the defect management information 140 stored in the DMI generator 360 to the backend 400 (step S15). The defect management information 140 is stored into the defect management device 477 of the backend 400.

Then, the CPU 361 records the defect management information 140 stored in the DMI generator 360, into the temporary defect management area 107A of the optical disk 100 (step S16).

On the other hand, if the optical disk 100 is not a blank disk (the step S11: NO), the CPU 361 judges whether or not the optical disk 100 is already finalized (step S17).

If the optical disk 100 is not finalized yet (the step S17: NO), the CPU 361 reads the newest defect management information 140 from any one of the temporary defect management areas 107A, 107B and 107C on the optical disk 100 (step S18).

Namely, if the optical disk 100 is not a blank disk, the defect management information 140 generated in the past, i.e. one or several setting information 141 and several partial defect lists 142A to 142D are recorded in one portion or all of the temporary defect management areas 107A, 107B and 107C. Thus, the CPU 361 firstly selects one defect management area which is in use now, to record the partial defect list. Then, the CPU 361 specifies the partial defect list recorded at last in the defect management area, i.e. the last partial defect list. Then, the CPU 361 refers to the index information appended to the last partial defect list, and specifies the setting information 141 and the partial defect list, minimally required for the constitution of the newest defect list 142 together with the last partial defect list. Then, the CPU 361 reads the last partial defect list, the partial defect list, and definition information 141.

Then, the CPU 361 uses the last partial defect list, the partial defect list, and the definition information 141 which are read, to construct the newest defect management information 140, stores this information into the DMI generator 360, and transmits this to the backend 400 (step S19). On the backend 400, the defect management information 140 is stored in the defect management device 477.

On the other hand, if the optical disk 100 is not a blank disk but is already finalized (the step S17: YES), the CPU 361 reads the defect management information 140 from the definite defect management area 105 (step S20), and transmits this information to the backend 400 (step S21). On the backend 400, the defect management information 140 is stored in the defect management device 477.

By virtue of the initial setting described above, the defect management information 140 is stored into the DMI generator 360 of the disk drive 300, and is stored into the defect management device 477 of the backend 400. By this, the preparation for the updating of the defect management information 140 is completed on DMI generator 360. On the other hand, the preparation for the defect management is completed on the defect management device 477.

Figure 19:
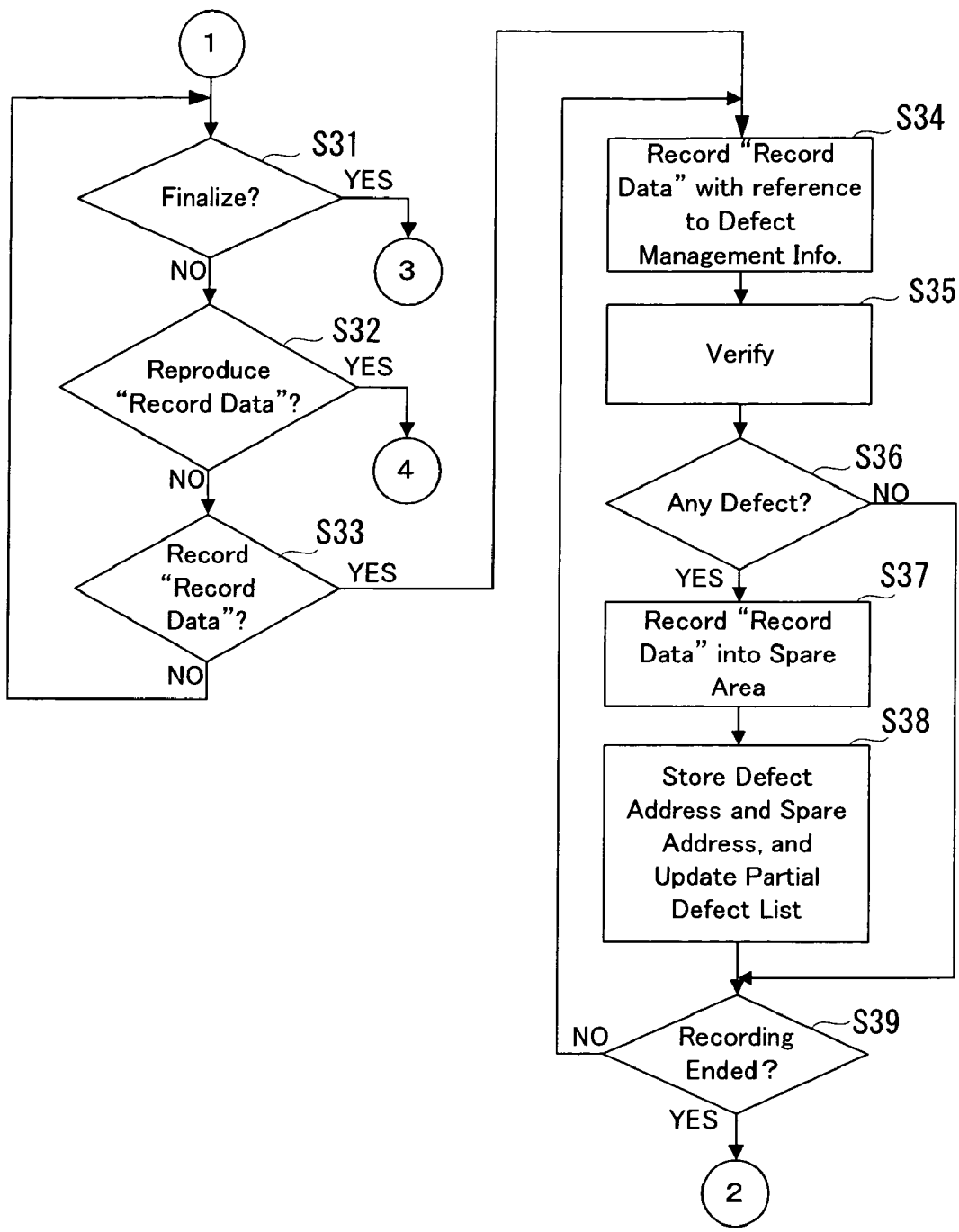
FIG. 19 is a flowchart showing the recording processing of the recording/reproducing apparatus.
Figure 20:
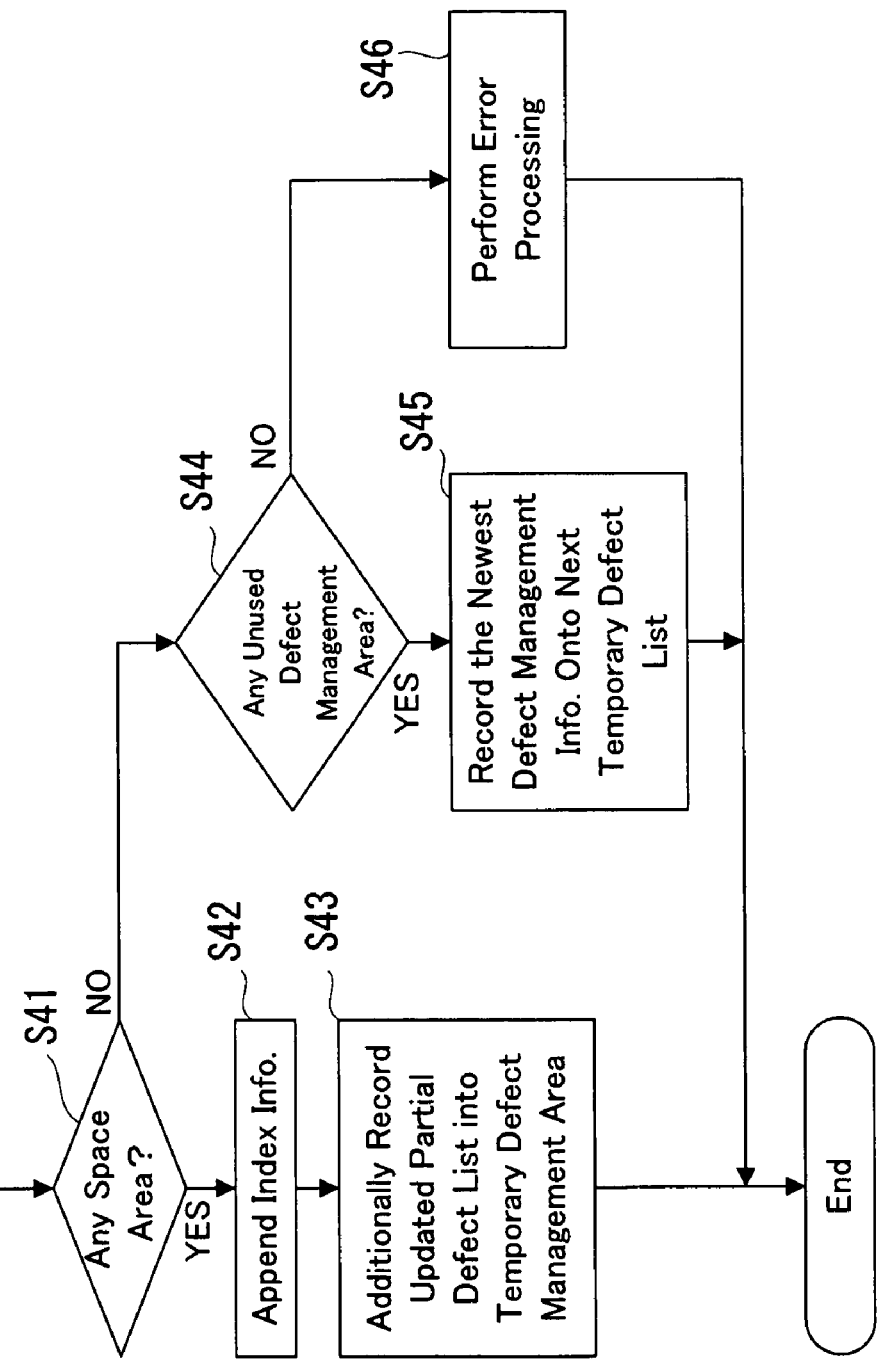
FIG. 20 is a flowchart following that in FIG. 19.

Next, the recording processing of the recording/reproducing apparatus 200 will be explained. FIG. 19 mainly shows the recording processing of the recording/reproducing apparatus 200. The recording/reproducing apparatus 200 performs the recording processing of recording the record data into the user data area 101 on the optical disk 100. The recording/reproducing apparatus 200 performs verifying during the recording processing, and updates any one of the defect lists 142A to 142D on the basis of the result of the verifying. The recording processing is realized by the cooperation of the CPU 361 of the disk drive 300 and the system controller 476 of the backend 400.

As shown in FIG. 19, if a user inputs an instruction of starting to record (step S33: YES), the recording/reproducing apparatus 200 responds to this and records the record data (step S34). The record data is recorded into each predetermined block.

The recording/reproducing apparatus 200 performs verifying at each time of the one block recording (step S35), and updates any one of the defect management lists 142A to 142D stored in the DMI generator 360, on the basis of the result of the verifying. Specifically, if it is recognized, as a result of the verifying, that the record data fails to be recorded (step S36: YES), the CPU 361 records the record data that fails to be recorded, into any one of the spare areas 102A to 103B (step S37). Then, the CPU 361 estimates that there is a defect in a place in which the record data is supposed to be recorded, and records the defect address for indicating the place and the corresponding spare address onto any one of the defect lists 142A to 142D (step S38). As described above, the partial spare areas 102A to 103B have a correspondence relationship with the partial defect lists 142A to 142D. Therefore, in the step S38, the defect address and the spare address are recorded onto the partial defect list corresponding to the partial spare area in which the record data is recorded in the step S37.

When the processing in the above-described steps S34 to S38 ends with respect to a series of blocks of the record data to be recorded this time (step S39: YES), the CPU 361 checks whether or not there is a space area in one defect management area which is in use now, to record the partial defect list (step S41).

If there is a space area in the one in-use defect management area (the step S41: YES), the CPU 361 appends the index information 143 onto the partial defect list updated in the DMI generator 360 (step S42), and additionally records the partial defect list and the index information 143, into the one in-use defect management area (step S43).

On the other hand, if there is not any space area in the one in-use defect management area (the step S41: NO), the CPU 361 checks whether or not there is an unused defect management area on the optical disk 100 (step S44).

If there is an unused defect management area on the optical disk 100 (the step S44: YES), the CPU 361 designates the unused defect management area, as one defect management area to be used next. Incidentally, if there are a plurality of unused defect management areas on the optical disk 100, the CPU 361 designates one of the plurality of unused defect management areas, as one defect management area to be used next. Then, the CPU 361 records the newest defect management information 140, into the setup area of the designated one defect management area (step S45). Specifically, since the newest defect management information 140 is stored in the DMI generator 360, the CPU 361 records the defect management information 140 stored in the DMI generator 360, i.e., the setting information 141 and one set of the partial defect lists 142A to 142D constituting the newest defect list 142, into the setup area of one defect management area to be used next (refer to FIG. 6 and FIG. 7).

On the other hand, if there is no unused defect management area on the optical disk 100 (the step S44: NO), the CPU 361 performs error processing, such as displaying an error message on the display panel of the recording/reproducing apparatus 200. Then, the recording processing is completed.

Figure 21:
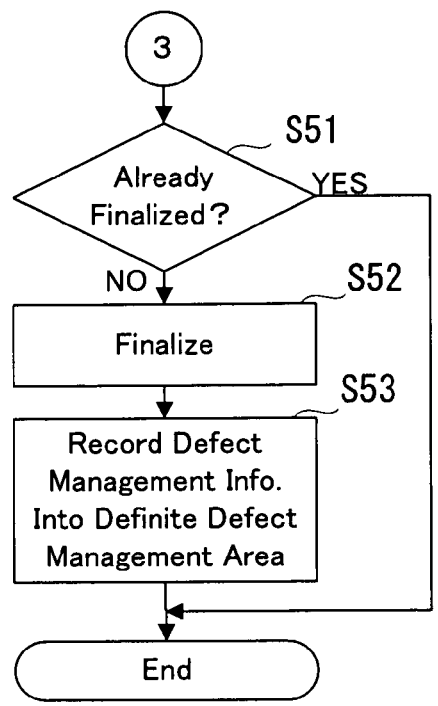
FIG. 21 is a flowchart showing the finalize processing of the recording/reproducing apparatus.

Next, the finalize processing of the recording/reproducing apparatus 200 will be explained. FIG. 21 shows the finalize processing of the recording/reproducing apparatus 200. For example, if the user inputs an instruction for indicating to finalize (the step S31 in FIG. 19: YES), the recording/reproducing apparatus 200 confirms that the optical disk 100 is not finalized yet (step S51: YES) and finalizes the optical disk 100 (step S52). Upon finalizing, the recording/reproducing apparatus 200 records the defect management information 140 stored in the DMI generator 360, into the definite defect management area 105 on the optical disk 100 (step S53). Then, the finalizing is completed.

Figure 22:
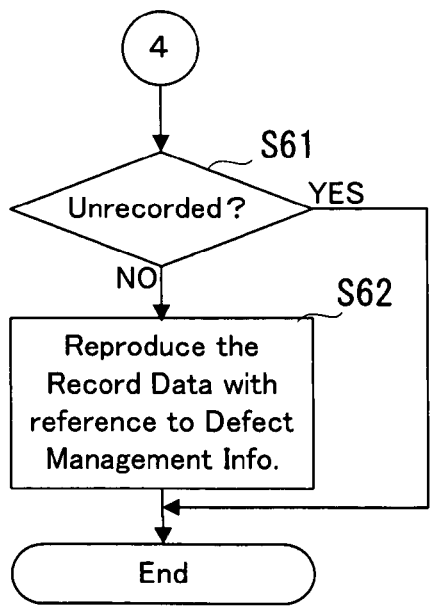
FIG. 22 is a flowchart showing the reproduction processing of the recording/reproducing apparatus.

Next, the reproduction processing of the recording/reproducing apparatus 200 will be explained. FIG. 22 shows the reproduction processing of the recording/reproducing apparatus 200.

If the user inputs an instruction of starting to reproduce (the step S32 in FIG. 19: YES), the recording/reproducing apparatus 200 confirms that the optical disk 100 is not a blank disk (the step S61: NO), and reproduces the record data recorded in the user data area 101 on the optical disk 100 (step S62). The recording/reproducing apparatus 200 reproduces the record data, while performing the defect management on the basis of the defect management information 140 stored in the defect management device 477 of the backend 400.

As described above, according to the recording/reproducing apparatus 200, it is constructed to select only the updated partial defect list and record this into the defect management area, so that it is possible to reduce the amount of information recorded into the defect management area. By this, it is unnecessary to provide the large defect management area for the recording medium, so that it is possible to increase the recording capacity for the record data.

Moreover, it is constructed such that if the defect management area used for the recording of the defect management information 140 is changed, the setting information 141 and all the partial defect lists 142A to 142D minimally required for the constitution of the newest defect list 142 are recorded into the defect management area to be used next. Thus, there are always the setting information 141 and all the partial defect lists 142A to 142D minimally required for the constitution of the newest defect list 142 in one defect management area which is in use. Therefore, next time when the newest defect list 142 and the setting information 141 are read, it is possible to read the partial defect lists 142A to 142D constituting the newest defect list 142 and the setting information 141 by searching the one defect management area. Thus, it is possible to quickly obtain the newest defect list 142 or the newest defect management information 140.

The present invention can be changed if desired without departing from the scope or spirit of the invention which can be read from the claims and the entire specification. A write-once-type recording medium, a recording apparatus, a reproducing apparatus, a recording method, a reproducing method, and a computer program that realizes these functions, which accompany such changes, are also intended to be within the technical scope of the present invention.

INDUSTRIAL APPLICABILITY

A write-once-type recording medium, a recording apparatus and a recording method for the write-once-type recording medium, a reproducing apparatus and a reproducing method for the write-once-type recording medium, and a computer program that realizes these functions associated with the present invention can be applied to a high-density recording medium, such as an optical disk, a magnetic disk, and a magneto-optical disk, for example. Moreover, they can be applied to a recording medium, a recording/reproducing apparatus, or the like, which are mounted on or can be connected to various computer equipment, for example.

The invention claimed is:

1. A write-once-type recording medium, comprising:
a data area in which record data is recorded;
a spare area in which the record data to be recorded or already recorded at a position of a defect in said data area is recorded; and
a plurality of defect management areas in which defect management information including a defect list is recorded, the defect list indicating the position of the defect in said data area and a position in said spare area at which the record data to be recorded or already recorded at the position of the defect is recorded,
said spare area being divided into a plurality of partial spare areas,
said defect list being divided into a plurality of partial defect lists,
each of the plurality of partial spare areas corresponding to respective one of the plurality of partial defect lists,
index information being appended to at least one of the plurality of partial defect lists, the index information being for specifying other partial defect lists minimally required for constitution of the newest defect list with the one partial defect list, and
a setup area being prepared in each of said defect management areas, the setup area being for recording all of the partial defect lists minimally required for the constitution of the newest defect list.

2. The write-once-type recording medium according to claim 1, wherein the setup area is prepared at a head position of each of said defect management areas.

3. The write-once-type recording medium according to claim 1, wherein the at least one partial defect list to which the index information is appended is placed at an end of the plurality of partial defect lists continuously arranged and recorded in one of said defect management areas.

4. The write-once-type recording medium according to claim 1, wherein the partial defect list has at least a size in which address information can be recorded by the number corresponding to the number of blocks of the record data which can be recorded in the partial spare area.

5. The write-once-type recording medium according to claim 1, further comprising a control information recording area in which information for controlling recording or reading to said data area is recorded,
at least one of the plurality of defect management areas being placed in said control information recording area.

6. The write-once-type recording medium according to claim 1, further comprising a control information recording area in which information for controlling recording or reading to said data area is recorded,
at least one of the plurality of defect management areas being placed between said control information recording area and said data area.

7. The write-once-type recording medium according to claim 1, wherein the plurality of defect management areas are distributed on a recording layer of the write-once-type recording medium.

8. A recording apparatus for recording record data onto a write-once-type recording medium comprising: (i) a data area in which record data is recorded; (ii) a spare area in which the record data to be recorded or already recorded at a position of a defect in said data area is recorded; and (iii) a plurality of defect management areas in which defect management information including a defect list is recorded, the defect list indicating the position of the defect in said data area and a position in said spare area at which the record data to be recorded or already recorded at the position of the defect is recorded, said spare area being divided into a plurality of partial spare areas, said defect list being divided into a plurality of partial defect lists, each of the plurality of partial spare areas corresponding to respective one of the plurality of partial defect lists, index information being appended to at least one of the plurality of partial defect lists, the index information being for specifying other partial defect lists minimally required for constitution of the newest defect list with the one partial defect list,
said recording apparatus comprising:
a first recording device for recording the record data into said data area;

a memory device for storing therein the defect management information;

a defect-detecting device for detecting a defect in said data area;

a second recording device for recording the record data to be recorded at the position in said data area of the defect detected by said defect detecting device, into any one of the partial spare areas;

a list-updating device for updating the partial defect list by recording, onto the partial defect list corresponding to the partial spare area, information for indicating the position of the defect detected by said defect-detecting device and a position in the partial spare area at which the record data to be recorded at the position of the defect is recorded;

a third recording device for recording the partial defect list updated by said list-updating device, into any one of said plurality of defect management areas; and a fourth recording device for recording all the partial defect lists minimally required for the constitution of the newest defect list, into any one of said plurality of defect management areas.

9. The recording apparatus according to claim 8, further comprising a space-area detecting device for detecting whether or not there is a space area required for the recording of the partial defect list, in one of said plurality of defect management areas, said fourth recording device recording all the partial defect lists minimally required for the constitution of the newest defect list, into another one of said plurality of defect management areas, if there is not any spare area in the one defect management area on the basis of a detection result of said space-area detecting device.

10. The recording apparatus according to claim 8, further comprising an index information appending device for appending the index information to the partial defect list updated by said list-updating device, the index information being for specifying the other partial defect lists minimally required for the constitution of the newest defect list with the updated partial defect list, said third recording device recording the partial defect list updated by said list-updating device, together with the index information, into any one of said plurality of defect management areas.

11. The recording apparatus according to claim 8, further comprising a list-obtaining device for specifying all the partial defect lists minimally required for the constitution of the newest defect list, from among the plurality of partial defect lists recorded in any one of said plurality of defect management areas, on the basis of the index information, for reading the plurality of partial defect lists specified, for combining the plurality of partial defect lists read, to thereby form the newest defect list, and for storing the newest defect list into said memory device.

12. A reproducing apparatus for reproducing record data recorded on a write-once-type recording medium comprising: (i) a data area in which record data is recorded; (ii) a spare area in which the record data to be recorded or already recorded at a position of a defect in said data area is recorded; and (iii) a plurality of defect management areas in which defect management information including a defect list is recorded, the defect list indicating the position of the defect in said data area and a position in said spare area at which the record data to be recorded or already recorded at the position of the defect is recorded, said spare area being divided into a plurality of partial spare areas, said defect list being divided into a plurality of partial defect lists, each of the plurality of partial spare areas corresponding to respective one of the plurality of partial defect lists, index information being appended to at least one of the plurality of partial defect lists, the index information being for specifying other partial defect lists minimally required for constitution of the newest defect list with the one partial defect list, said reproducing apparatus comprising:

a list-obtaining device for specifying all the partial defect lists minimally required for the constitution of the newest defect list, from among the plurality of partial defect lists recorded in any one of said plurality of defect management areas, on the basis of the index information, for reading the plurality of partial defect lists specified, and for combining the plurality of partial defect lists read, to thereby form the newest defect list; and a reproducing device for reproducing the record data recorded in said data area on the basis of the newest defect list formed by said list-obtaining device.

13. A computer program product comprising a computer-readable medium for tangibly embodying a program of instructions executable by a computer to make the computer function as a recording apparatus according to claim 8.

14. A computer program product comprising a computer-readable medium of instructions for tangibly embodying a program of instructions executable by a computer to make the computer function as a reproducing apparatus according to claim 12.

15. A recording method of recording record data onto a write-once-type recording medium comprising: (i) a data area in which record data to be recorded; (ii) a spare area in which the record data to be recorded or already recorded at a plurality of defect management areas in which defect management information including a defect list is recorded, the defect list indicating the position of the defect in said data area and a position in said spare area at which the record data to be recorded or already recorded at the position of the defect is recorded, said spare area being divided into a plurality of partial spare areas, said defect list being divided into a plurality of partial defect lists, each of the plurality of partial spare areas corresponding to respective one of the plurality of partial defect lists, index information being appended to at least one of the plurality of partial defect lists, the index information being for specifying other partial defect lists minimally required for constitution of the newest defect list with the one partial defect list, said recording method comprising:

a memory process of storing therein the defect management information;

a first recording process of recording the record data into said data area;

a defect-detecting process of detecting a defect in said data area;

a second recording process of recording the record data to be recorded at the position in said data area of the defect detected in said defect detecting process, into any one of the partial spare areas;

a list-updating process of updating the partial defect list by recording, onto the partial defect list corresponding to the partial spare area, information for indicating the position of the defect detected by said defect-detecting process and a position in the partial spare area at which the record data to be recorded at the position of the defect is recorded;

a third recording process of recording the partial defect list updated in said list-updating process, into one of said plurality of defect management areas if there is a space area in the one defect management area; and a fourth recording process of recording all the partial defect lists minimally required for the constitution of the newest defect list, into another one of said plurality of defect management areas if there is not any space area in the one defect management area.

16. A reproducing method of reproducing record data recorded on a write-once-type recording medium comprising: (i) a data area in which record data is recorded; (ii) a spare area in which the record data to be recorded or already recorded at a position of a defect in said data area is recorded; and (iii) a plurality of defect management areas in which defect management information including a defect list is recorded, the defect list indicating the position of the defect in said data area and a position in said spare area at which the record data to be recorded or already recorded at the position of the defect is recorded, said spare area being divided into a plurality of partial spare areas, said defect list being divided into a plurality of partial defect lists, each of the plurality of partial spare areas corresponding to respective one of the plurality of partial defect lists, index information being appended to at least one of the plurality of partial defect lists, the index information being for specifying other partial defect lists minimally required for constitution of the newest defect list with the one partial defect list, said reproducing method comprising:

a list-obtaining process of specifying all the partial defect lists minimally required for the constitution of the newest defect list, from among the plurality of partial defect lists recorded in any one of said plurality of defect management areas, on the basis of the index information, of reading the plurality of partial defect lists specified, and of combining the plurality of partial defect lists read, to thereby form the newest defect list; and a reproducing process of reproducing the record data recorded in said data area on the basis of the newest defect list formed in said list-obtaining process.

* * * * *